(12) United States Patent
Oktem et al.

(10) Patent No.: US 8,884,759 B2
(45) Date of Patent: Nov. 11, 2014

(54) DYNAMIC PREDICTION OF RISK LEVELS FOR MANUFACTURING OPERATIONS THROUGH LEADING RISK INDICATORS

(75) Inventors: Ulku G. Oktem, Philadelphia, PA (US); Ankur Pariyani, Philadelphia, PA (US)

(73) Assignee: Near-Miss Management, LLC, Philadelphia, PA (US)

( * ) Notice: Subject to any disclaimer, the term of this patent is extended or adjusted under 35 U.S.C. 154(b) by 113 days.

(21) Appl. No.: 13/610,446

(22) Filed: Sep. 11, 2012

(65) Prior Publication Data

US 2013/0063264 A1 Mar. 14, 2013

Related U.S. Application Data

(60) Provisional application No. 61/533,500, filed on Sep. 12, 2011, provisional application No. 61/545,671, filed on Oct. 11, 2011.

(51) Int. Cl.
*G08B 21/00* (2006.01)
*G05B 23/02* (2006.01)

(52) U.S. Cl.
CPC .......... *G05B 23/024* (2013.01); *G05B 23/0278* (2013.01)
USPC ............ 340/540; 340/999; 702/179; 702/183

(58) Field of Classification Search
USPC .................. 340/540, 999; 702/179, 182, 183
See application file for complete search history.

(56) References Cited

U.S. PATENT DOCUMENTS

| | | |
|---|---|---|
| 4,869,528 A | 9/1989 | Buma |
| 5,355,395 A | 10/1994 | Kenneth |
| 5,552,770 A | 9/1996 | McMaster |
| 6,498,976 B1 | 12/2002 | Ehlbeck |
| 6,931,387 B1 | 8/2005 | Wong |
| 7,113,940 B1 | 9/2006 | Jensen |
| 7,353,057 B2 | 4/2008 | Schiessle |
| 7,522,035 B2 | 4/2009 | Albert |
| 7,526,405 B2 | 4/2009 | Miller |
| 7,580,362 B2 | 8/2009 | Timus |
| 7,908,660 B2 | 3/2011 | Bahl |
| 2010/0102631 A1 | 4/2010 | Chiou |

OTHER PUBLICATIONS

Oktem, U.S. Appl. No. 61/545,671.
Oktem, U.S. Appl. No. 61/533,500.
International Search Report for PCT/US12/54658.
Written Opinion for PCT/US12/54658.

(Continued)

*Primary Examiner* — Jeffery Hofsass
(74) *Attorney, Agent, or Firm* — Novak Druce Connolly Bove + Quigg LLP

(57) ABSTRACT

Provided are methodologies to properly assess and manage operational risks at operations sites, e.g., a manufacturing, production or processing facility, such as a refinery, chemical plant, fluid-catalytic-cracking units, or nuclear energy plant, or a biological or waste management facility, airport or even financial institutions, or at any facility in which operations are often accompanied by risk associated with many high-probability, low-consequence events, often resulting in near-misses. In some operations, processes are monitored by alarms, but the invention operates on either process data or alarm data. The methods are based upon measurement of one or more variables, and/or utilization and management of the concept of "hidden process near-miss(es)" to identify a change or escalation, if any, in probability of occurrence of an adverse incident. The methodologies combine a plurality of subsets (also useful independently) of dynamically calculated leading risk indicators for dynamic risk management.

28 Claims, 28 Drawing Sheets

(56) References Cited

OTHER PUBLICATIONS

Meel A., and W. D. Seider, "Plant-Specific Dynamic Failure Assessment using Bayesian Theory," Chem. Eng. Sci., 61, 7036-7056 (2006).

Meel, A., L. M. O'Neill, W. D. Seider, U. Oktem and N. Keren, "Operational Risk Assessment of Chemical Industries by Exploiting Accident Databases," J. Loss Preven. Proc. Indust, 20, 113-127 (2007).

Meel, A., and W. D. Seider, "Real-time Risk Analysis of Safety Systems," Comput. Chem. Eng., 32, 827-840 (2008).

Oktem, U. G., and A. Meel, "Near-Miss Management: A Participative Approach to Improving System Reliability", Encyclopedia of Quantitative Risk Assessment and Analysis, Melnick, E., and Everitt, B. (eds). John Wiley & Sons Ltd., Chichester, UK, pp. 1154-1163 (2008).

Pariyani, A., W. D. Seider, U. G. Oktem, and M. Soroush, "Incidents Investigation and Dynamic Analysis of Large Alarm Databases in Chemical Plants: A Fluidized-Catalytic-Cracking Unit Case Study," Ind. Eng. Chem. Res., 49, 8062-8079 (2010).

Pariyani, A., W. D. Seider, U. G. Oktem, and M. Soroush, "Improving process safety and product quality using large databases," 20th European Symposium on Computer Aided Process Engineering (ESCAPE), 28, 175-180 (2010).

Pariyani, A., P. Kleindorfer, U.G. Oktem,W.D. Seider,"Assessment of Catastrophe Risk and Potential Losses in Industry", AlChE J. 58(3):812-825 (2012).

Pariyani, Ankur, et al. "Dynamic risk analysis using alarm databases to improve process safety and product quality: Part I—Data compaction." AlChE Journal 58.3 (2012): 812-825.

Pariyani, Ankur, et al. "Dynamic risk analysis using alarm databases to improve process safety and product quality: Part II—Bayesian analysis." AlChE Journal 58.3 (2012): 826-841.

Pariyani Ankur, Ulku Oktem, and Warren D. Seider. "Near-Miss Management to Develop Dynamic Leading Indicators to Predict Incidents." 6th Global Conference on Process Safety, AlChE Spring Meeting, Austin, Texas (2010).

Oktem, U. et al. "Near-Miss Incident Management in the Chemical Process Industry." Risk Analysis 23.3 (2003): 445-459.

Oktem, U. et al. "Near-miss management: Managing the bottom of the risk pyramid." Risk Reg (Special Issue on close calls, near misses and early warnings) (2010): 12-13.

| Star Rating ▼ | Variable/ Alarm | Total Recovery Time ☑ | Average Recovery Time ☑ | Frequency of Alarms ☑ | Average Inter-arrival Time ☑ | Average Neighborhood Time ☑ | Average Kick-off Time ☑ |
|---|---|---|---|---|---|---|---|
| 6 ✦ | FI-400 H1 Alarm | ✓ | ✓ | ✓ | ✓ | ✓ | ✓ |
| 3 ✦ | ... | ... | ... | ... | ... | ... | ... |

DYNAMIC PREDICTION OF RISK LEVELS FOR MANUFACTURING OPERATIONS THROUGH LEADING RISK INDICATORS

CROSS-REFERENCE TO RELATED APPLICATIONS

This application claims priority to U.S. Provisional Application 61/533,500 filed on Sep. 12, 2011, and to U.S. Provisional Application 61/545,671 filed on Oct. 11, 2011, each of which is incorporated herein in its entirety.

FIELD OF THE INVENTION

The dynamic risk predictor suite of the present invention identifies, prioritizes, and presents risks associated with an operation including a plant's operations in a manner that enables operating personnel (including management) at a facility to have a comprehensive understanding of the risk status and changes in the risk levels of processes, including in those facilities in which operations are monitored by a plurality of alarms or an alarm system. The hidden process near-miss information may be combined with related process data and/or data resulting from prior near-miss situations to permit preemptive corrective action to reduce or avert the occurrence of adverse incidents or catastrophic failure of a facility operation.

BACKGROUND OF THE INVENTION

Every low-probability, high-consequence adverse incident or catastrophic operational failure at any production or processing facility, such as a chemical plant, fluid-catalytic-cracking units (FCCU) at a petroleum refinery, or nuclear energy production plant, or even a biological facility or waste management facility, is preceded by many high-probability, low-consequence events, which are often recognized by alarms or as near-misses (Pariyani et al., *Ind. Eng. Chem. Res.* 49:8062-8079 (2010a); Pariyani et al., *20th European Symposium on Computer Aided Process Engineering (ESCAPE)* 28:175-180 (2010b)). Temperatures may go too high, tanks may run dry, power outages may cause all sorts of problems, or perhaps lead to flooding, and the like. An ideal risk management system at the plant will account for all these near-misses, and develop leading indicators to notify the operators in advance of undesirable incidents that are likely to happen. In particular, such knowledge becomes highly desirable for unmanned plants/facilities.

For example, in the following situations, the public has been harmed by industrial accidents, adverse events, and/or catastrophic failures that could have been avoided by an optimal alarm system. For example, the US government chemical safety board web site (www.csb.gov) is inundated with reports of accidents that took place in the chemical manufacturing facilities in the recent years that cost several lives, as well as property damage. The recurring themes in the outcome of analysis of these accidents are a) the lack of preventive maintenance, and b) the lack of attention to process near-misses. Moreover, every year billions of dollars are lost in the manufacturing industry due to "trips" (unexpected shutdowns due to malfunction of the equipment and/or control systems) at operational plants and facilities. For instance, there have been $6 billion/year losses recorded by US refineries from unexpected shut downs of crude and fluidized catalytic cracking (FCC) units.

An additional condition, which is frequently observed in most manufacturing or processing facilities, is silencing (muting) the alarms that are considered to be nuisance. These are alarms that are activated so often that that are considered to be of such little significance by the operators, that they are regarded as unimportant disturbances resulting from normal operations, so they are turned off or ignored like fire drills in office buildings. But such actions negate the value of the alarm system. For example, at an offshore refinery facility visited in 2011 by the inventors, most of the "low priority" alarms had been silenced. In fact, one of the reasons that the BP off shore accident in Gulf of Mexico in 2010 (where 11 people died and 17 were injured) was not identified in its early stages was because an alarm had been silenced because it had been going off in the middle of the night and awaking the workers.

Thus there is a need, not met until the present invention, for a "distributed control system" (DCS) and "emergency shutdown" (ESD) system databases and a variety of disclosed processes using an dynamic system that analyzes alarm and process data to assess operational risks as they change with time and to send alert signals and/or reports to address risk and/or alarm variables and to reduce or prevent adverse incidents or failures.

SUMMARY OF THE INVENTION

A methodology is provided by the present invention to properly manage alarms (and alarm data) and/or to assess operational risks at a manufacturing, production or processing facility, refinery or the like (herein generally referred to as "plant/facility" without intended specificity to type of plant or facility). The method is based upon measurement of one or more variables, and/or utilization and management of the concept of "hidden near-miss(es)" to identify a change or escalation, if any, in the probability of the occurrence of an adverse incident. The methodology of the invention is termed the Dynamic Risk Predictor Suite (DRPS), and is actually a combination of a plurality of subsets (also useful independently) of dynamically calculated leading risk indicators for dynamic risk management.

"Dynamically" means that the operation is monitored at frequent intervals. A "leading risk indicator" (LRI) is an indicator (or set of indicators) that provide information indication potential of upcoming or approaching risk(s). More specifically, LRI indicates the level of risk in a plant/facility operation or sub-operation at any given time, or over a period of time, or showing a change in risk levels from one point in time to another. The leading risk indicators used in the methodology are reported in different frequencies and formats to more readily assess different levels of plant/facility management, and offer significant improvements in safety and/or performance of the plant/facility by reducing losses in all areas.

Rapid advancements of technology means that companies can now store massive volumes of data collected on an ongoing basis in almost all continuous processes. However, the effective use of this data to improve safety, productivity and reliability of operational processes has been lagging, and current prior art methodologies are based on mathematical modeling and periodic visual inspections, with almost no use of ongoing collected data. As a result, it is an object of the present invention to provide significant innovation in identifying and managing process risks. Methods are provided to increase the capacity of plant/facility operators to understand developing risks before occurrence of a corresponding adverse incident, and to determine critical needs that must be addresses. This is accomplished by analyzing data collected during processes operations, extracting information therefrom, and providing actionable guidance to improve safety, reliability, and quality by calculating deviations from normal operations (i.e., operations functioning at a level deemed to be acceptable to plant/facility operators and/or owners), and classifying the operations based on the severity of the deviation.

Systems currently use visually observed or observable process near-misses. But the unobserved deviations that the present invention has found within the collected data, which were previously unknown or unrecognized, are collectively referred to herein by the above-referenced new term—"hidden process near-misses." Thus, the present invention advantageously utilizes the information found in the hidden process near misses to identify potential problems in advance of their occurrence. A key feature of the invention therefore is to identify one or more risk as a measure of deviation of process conditions from normal operations, as identified by analyzing long-term behavior of the operation. The higher the deviations, the more serious are the risks. Process and alarm data over long periods of time ("long term periods") are used to identify the behavior of normal operations that are acceptable to the plant/facility, thereby setting a baseline against which the new information from the combined near miss data including the hidden process near misses are compared and classified.

It is an object of the Dynamic Risk Predictor Suite to address: a) the lack of preventive maintenance at a plant/facility, and b) the lack of attention to adequately process near-misses at the plant/facility, including the lack of identification of hidden process near-misses and the lack of understanding the impact of "hidden process near-misses" (hidden operational risks). The Dynamic Risk Predictor Suite is designed to tackle both of these issues by a) prioritizing the alarms to identify alarms associated with high priority items for critical and/or immediate maintenance or modification of settings, b) identifying changes in alarms to pinpoint risk levels to the operations, and c) detecting possible trip/accident conditions in a timely manner so that plant/facility personnel (including management and operators, herein referred to general as "operators") can address the critical conditions before damage is done during an incident—together this is referred to as "operational fitness" of the plant/facility. In fact, 50% of the cited $6 billion/yr in losses in all US refineries from unexpected shut downs of crude and fluidized catalytic cracking (FCC) unit can be eliminated thorough use of Dynamic Risk Predictor Suite.

Moreover, use of the DRPS System will permit an additional $600 million/year in estimated savings by eliminating preventable downtime of hydrogen plants in the US. In the European Union, this number is about $100×10^6$. In addition, the System will offer significant savings in lost opportunity costs. For example, in a major Gulf Coast accident, public estimates suggested that BP suffered $60 billion in total loss including of reputational losses. Accordingly, by conservatively reducing the probability of the occurrence of major accidents by as little as 10-25% over current levels, the Dynamic Risk Predictor Suite will significantly reduce the physical and the reputation loss that occurs whenever businesses suffer operational losses that result in loss of lives, or that directly and adversely affect the public.

The Alarm Fitness Module of the Dynamic Risk Predictor Suite operates by employing various new and novel methods to identify a variety of problems with operations, and to prioritize them for maintenance, as well as for management attention for desired time periods, on-demand or on real-time basis.

Thus, it is an object of the analytical tools of the present invention therefore are used to reliably provide information to the operator(s) and plant personnel at a plant/facility that there is a potential major adverse incident or problem likely to occur in the near future at the plant/facility.

In an embodiment of the invention, notification is provided regarding detection of the onset and/or presence of inherent faults, or special dangers, likely to lead eventually to adverse incident(s). Thus, the use of the present invention permits operators to be alerted up to several minutes or hours, or from 3-30 hours, from 12-24 hours, from 1-30 days or more, before potentially undesirable adverse events or problems are likely to occur. Thereafter, as the special-cause(s) of the alarm progresses, the possibility of accident(s) increases directly as the frequency of alerts are increased.

It is a further object to quantify the risks associated with the operations in a plant/facility and to maintain risk levels to a minimum, thereby improving safety, operability, reliability, and profitability.

An embodiment of the invention offers at least three main purposes. First, the System detects the presence of problematic alarms, and identifies safety and operability risks associated with the alarms or alarm systems. Information reported at regular times or on-demand provides advanced notification to the operators of problems at or preferably before onset, permitting the operators to prepare or take precautionary actions before the adverse events actually occur.

Secondly, the DRPS System sends alert signals to the operators in real time about approaching or instantly occurring incidents or trips, preferably before major adverse incidents. The "lead-times" (i.e., the time between the alarm alert-notification and the occurrence of the undesirable event/incident/failure) for alerts can vary from hours to seconds depending upon the severity and progression of a fault (or special-cause) and the nature of the fault. The inventors' studies have shown that the lead times range from several hours to 3 minutes or less. The lead time(s) can: (a) help the operators reduce or prevent the occurrences of undesirable events or adverse incidents by permitting appropriate avertive actions, and (b) better prepare the operators for tackling the consequences, should an undesirable adverse event incident occur.

Thirdly, the DRPS System identifies inherent and gradually developing (under the radar) or hidden risks, and alert the management of the facility of changes in operational risk levels at the plant/facility dynamically (in frequent intervals), with special messages sent when the risk levels change, or increase significantly. As used herein, "frequent intervals" or "frequently measured" with regard to process data means that process variables are monitored and reported at least every 1 second, and with regard to the alarm means that alarm data is monitored and reported at least every 1 microsecond.

It is an object of the implemented methods of the invention, as embodied in one or more subsystems of the Dynamic Risk Predictor Suite, to reduce at least 10%, up to 100%, of the probable occurrence of such adverse incidents or catastrophic failures before they occur as compared to presently available methods used by the same facilities. The general term "adverse incident(s)" is used herein to generally encompass all problems, adverse events, catastrophes and catastrophic failures of all types without limitation, if associated with a process system which may or may not be monitored by alarms.

Notably, the risk information provided by the alerts of this invention (just-in-time or on-demand risk indicators) are presumed to be important because they have been based on the data obtained from alarm and process measurements established by the plant/facility owners or operators at the plant/facility, and each therefore signifies an increased risk that is likely to eventually lead to adverse incidents and/or trips. As a result, the embodied methodology in the present invention advantageously offers the ability to effectively detect the most critical adverse incidents and trips, forewarning operators and management about the onset and progress of risks by utilizing the "hidden near-miss" data to flag alerts having lead times from several days or several hours to a few minutes. The Dynamic Risk Predictor Suite has been shown to provide extra protection, helping operators detect the incidents in real time and in advance of their occurrence, permitting appropriate corrective actions to be taken in advance of a significant adverse incident, failure, or loss of life, and as needed to prepare to tackle any resulting adverse consequences.

Additional objects, advantages and novel features of the invention will be set forth in part in the description, examples and figures which follow, all of which are intended to be for illustrative purposes only, and not intended in any way to limit the invention, and in part will become apparent to those skilled in the art on examination of the following, or may be learned by practice of the invention.

BRIEF DESCRIPTION OF THE FIGURES

The foregoing summary, as well as the following detailed description of the invention, will be better understood when read in conjunction with the appended drawings. Components which are essentially the same are given the same reference numbers through-out the drawings. It should be understood, however, that the invention is not limited to the precise arrangements and instrumentalities shown.

DETAILED DESCRIPTION OF THE INVENTION

The Dynamic Risk Predictor Suite (DRPS) system comprises at least four subsystems, designed to be utilized individually or jointly, the details of which follow. The Subsystems are:

(1) Alarm Fitness (AF),
(2) Dynamic Risk Analyzer (DRA),
(3) Real-time Leading Signal Generator (LSG), and
(4) Near-Miss Surfer (NMS).

I. The Alarm Fitness Subsystem

Alarm Fitness system (AF) is designed to exploit most "raw alarm data" recorded by "distributed control system" (DCS) and "emergency shutdown" (ESD) database systems, and converted to a knowledge base on "risk-based alarm data analysis." "Raw Alarm data" is related to the process data since alarms are based on set values of process variables (also termed "process parameters" in literature). Notably, each variable is equipped by an alarm if identified as an important variable. Only the variables that are thought to be very important, are not only measured, but are also controlled by the DCS and are equipped by one or more alarms. For example, a temperature variable would have H1, L1, H2 (higher than the preset H1), and L2 (lower than the preset L1) alarms, wherein the alarms are set so that they are activated when the variable reaches the identified value preset by the plant or facility using the alarms. As a result, in this example there would be four alarms associated with the temperature values. The actual value of the temperature would be part of "process data;" reported alarm activations and deactivations would be part of "alarm data." Both activations and deactivations are recorded and reported by the DCS. Of course, not all process variables have four alarms. Some could have only one, whereas others could have 10 or more. Conversely, some less important ones may have none. The number of alarms depends on the process operation and the design of alarm system.

Some process variables are also equipped with "Emergency Shutdown Systems" (ESD). These systems activate an alarm informing the operator of the real-time extreme condition, and either sequentially or simultaneously tries to correct the situation by automatically causing a corrective action, and if that does not work, shutting down the system. Alternatively, the ESD may simply shut down the system without additional corrective action. Typically, ESD settings are higher than H2/L2 and H1/L1 alarm settings, however in some cases, they are identical with H2/L2 alarm settings.

Figure 1:
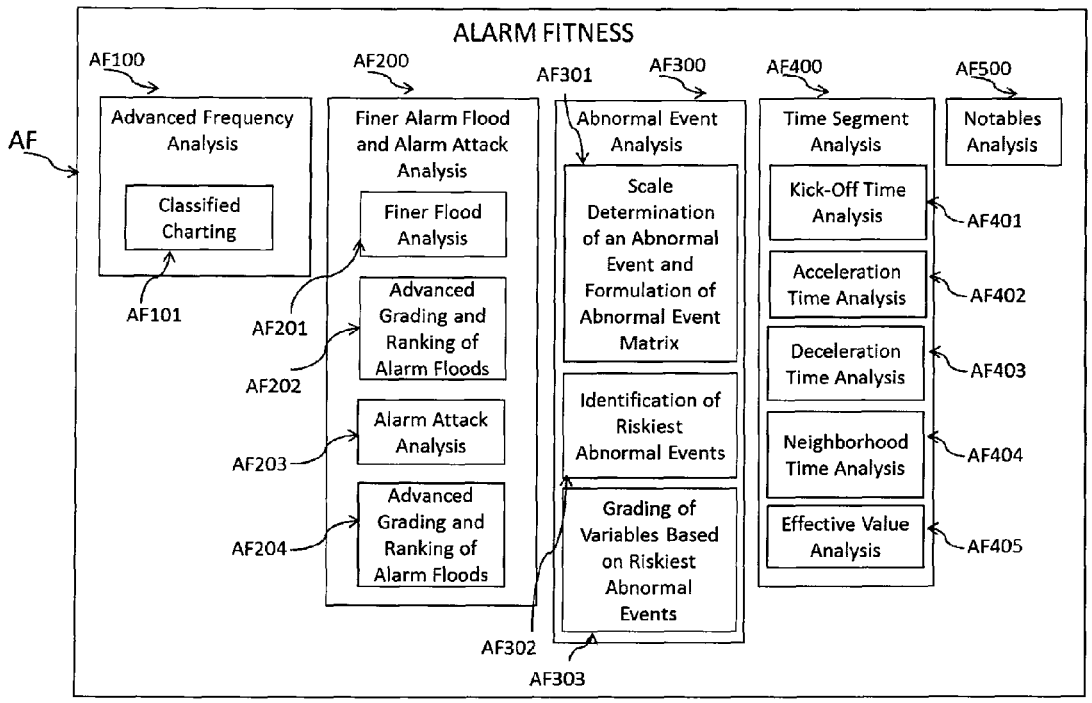
FIG. 1 schematically illustrates the Alarm Fitness system AF, showing its component elements.

FIG. 1 schematically illustrates the Alarm Fitness system AF and its components, denoted by Advanced Frequency Analysis (AF100), Finer Alarm Flood and Alarm Attack Analysis (AF200), Abnormal Event Analysis (AF300), Time Segment Analysis (AF400), and Notables Analysis (AF500). The components signify "advanced alarm data analysis" and transform "raw alarm data" to serve three purposes summarized below. The new methods bring significant improvements and new perspectives over existing/standard techniques and software on "alarm management." The three purposes served by AF are:

(1) To provide risk information/rating/status as conveyed by the alarm system. For example, AF signals increased/decreased potential for problems that may be lurking, as indicated by the novel concepts defined below (e.g., significant reduction in kick-off times, significant increase in recovery times, etc.).
(2) To help engineers and operators configure alarms on an ongoing basis, to improve the accuracy and significance of information the alarms provide.
(3) To signal potential issues/problems with the alarm system.

Note that methods defined in Alarm Fitness system apply for those facilities and process variables as well which are not equipped with alarms. In these cases, for any variable, alarms can be set at predetermined limits and "raw alarm data" can be obtained from process data when the variable crosses the set limits.

I.A. The Advanced Frequency Analysis:

The "Advanced Frequency Analysis," component AF100 of the Alarm Fitness system, comprises: (a) developing a "classified chart," which refers to a chart with banded zones indicating different significance levels, (b) identifying or classifying frequency bands for meaningful interpretation, and c) analyzing the data within a given zone as well as between the zones, for one or more time periods.

Figure 2:
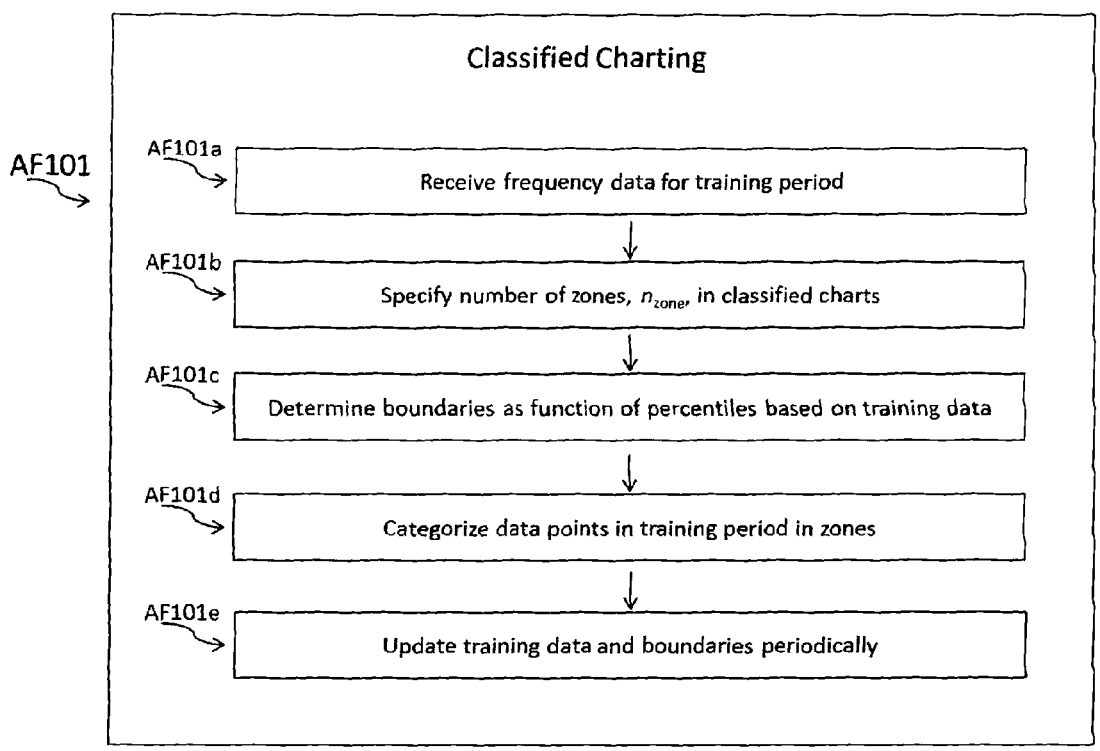
FIG. 2 schematically illustrates developing a classified chart with banded zones indicating significance levels, identifying or classifying frequency bands for meaningful interpretation, and analyzing data within a zone or zones for one or more time periods as part of the Advanced Frequency Analysis component of the Alarm Fitness system.
Figure 3:
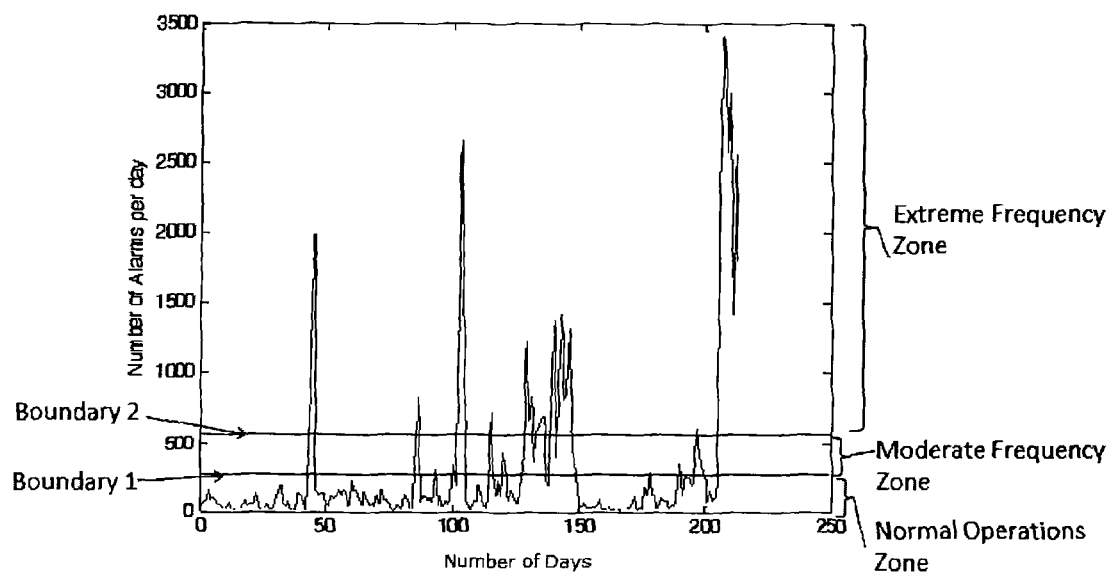
FIG. 3 graphically shows a classified alarm frequency chart that presents frequency of alarms per day for a period of 7 months.

I.A.1. Classified Charting:

Method AF101 (see FIG. 2) provides "classified charts" indicating zones of varying significance utilizing steps AF101a thru AF101e as described. First step, AF101a, provides receiving "frequency data," also known as "training data" when it is gathered during a "training period." The "training data" is defined as any set of representative data collected over a long period of time (long-term) to provide typical and characteristic information to be used in calculations in consideration; training data is collected within a time frame that ranges between 30 to 365 days—typically 60 days. Thus, the time frame during which the training data is collected is referred as the "training period." Second step, AF101b, specifies the number of zones, $n_{zone}$, in classified charts. For example, FIG. 3 shows a "classified chart" with three zones ($n_{zone}$=3) signifying extreme, moderate and normal intensity/severity of frequency values. These three zones are identified using "frequency bands"—normal, moderate and extreme frequency zones, as shown. Third step, AF101c, sets the boundaries of these zones using "training data." For example, for FIG. 3, the boundary between the normal and the moderate bands (referred to as "boundary 1") is set anywhere between 60th and 80th percentile based on the training data. A typical value is 75th percentile. Each boundary is updated periodically as more training data becomes available. If a fixed boundary is desired, a target value is specified by the operations. The boundary between the moderate and the extreme bands (referred as "boundary 2") is set as a function of the difference between Boundary 1 and another percentile, for example at 75th Percentile+$\mu$*(75th % ile-25% ile). Typically, $\mu$ ranges from 1 to 3. Fourth step, AF101d, categorizes data points in a training period in the identified zones. Fifth step, AF101e, updates both the training data and boundaries periodically—typically updates are daily.

The frequency data received in AF101a can include "raw alarm data," "raw abnormal events data," "time segment related data," and the like. "Raw abnormal events data," refers to data on "abnormal events" for different variables for a given time period, as will be described in greater detail below. "Time segment related data" refers to data on "time segment" calculations (such as values of "acceleration time," "deceleration time," "kick-off time," "neighborhood time") for different variables for a given time period, as described in greater detail below.

As applied to "raw alarm data." there are "Alarm Frequency Charts" (AFCs), the use of which is known in the art. Typically, 10-min, 1-hour, daily, and weekly alarm frequency charts are used in alarm tracking/management practice. "Classified alarm frequency charts" (CAFCs) are prepared for different frequencies of alarms, e.g., 1-min, 10-min, hourly, daily, weekly, biweekly, monthly, quarterly, and the like as needed, and as indicated, the boundaries are updated periodically. In addition, the charts are prepared for "raw alarm data" associated with the entire process operation or for a select group of alarms.

As an example, FIG. 3 shows a classified alarm frequency chart, which presents frequency of alarms per day for a period of 7 months. In FIG. 3, the 75th and 25th percentiles are equal to 234 and 44. Consequently, using the 7-month data as training period, the thresholds for the normal and moderate bands, or for the moderate and extreme bands, are calculated as 234 (equal to 75th percentile) and 519 (equal to 75th percentile+$\mu$*(75th percentile-25% percentile) with $\mu$=1.5). Using this data, out of a total of 214 data points, 160 data points are within the normal band zone, 24 data points are in the moderate band zone, and 30 points are in the extreme band zone.

Thus, an important utility of the classified charts, including classified alarm frequency charts, is that they quantify the proportion of data points in each zone including the extreme data points (e.g., in above example, 14% of the data points lie in the extreme band zone), which helps plant/facility personnel to understand quantitatively the proportion of important data points ("attention points"), so that the operators and plant/facility personnel can focus on addressing and reducing occurrence of data points in the extreme zone.

Another utility of these charts is to permit plant/facility personnel to compare the performance of an alarm system over different time periods. For example, a comparison of monthly frequency (and/or percentage) of extreme data points informs the plant/facility personnel about the months that are seen to have more days of extreme alarm frequency. Further, these charts enable quantitative comparison of alarm frequencies for different equipment/units for different time periods. In other words, the proportions of data points in the displayed zones or bands serve as a standardized tool or criterion to compare different frequency charts for (a) different equipment/units, as well as (b) for different time periods. This is important because presently, frequency charts present data points without designating bands or zones; and as a result the prior art offers no mechanism for direct identification of data points that that are of particular relevance, such as the 30 points (out of 210) which were in the "extreme frequency zone." Although certainly points in the extreme zone deserve the most attention from plant/facility personnel, in a prior art frequency chart (without any zones or bands), it is not easy to identify or pinpoint these "extreme" data points (or simply "outliers") directly, meaning that the significance of those points may be missed. This disadvantage in the prior art is overcome by the presently disclosed methods, using charts and lists, to permit plant/facility personnel to now recognize signals of extreme occurrence before problems arise or accidents occur.

Figure 4:
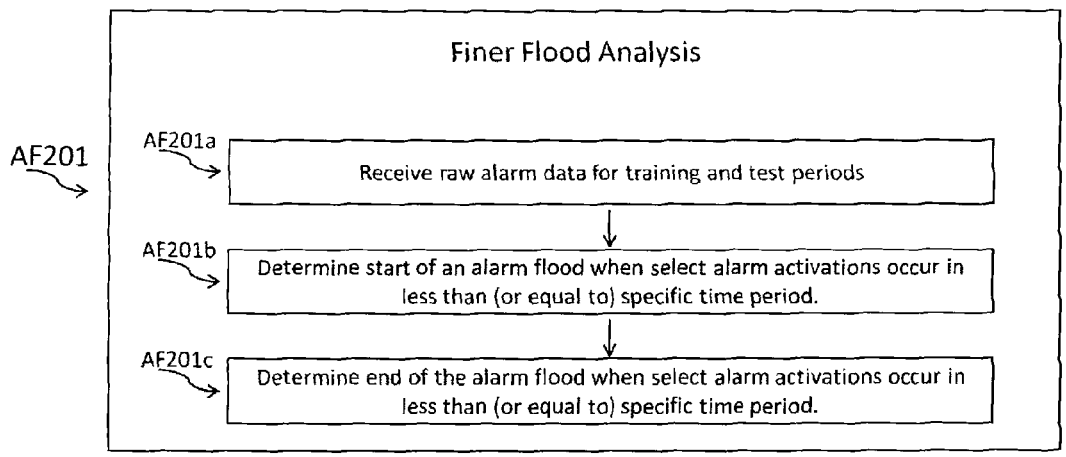
FIG. 4 schematically illustrates the Finer Flood Analysis method of the Alarm Fitness system.
Figure 5:
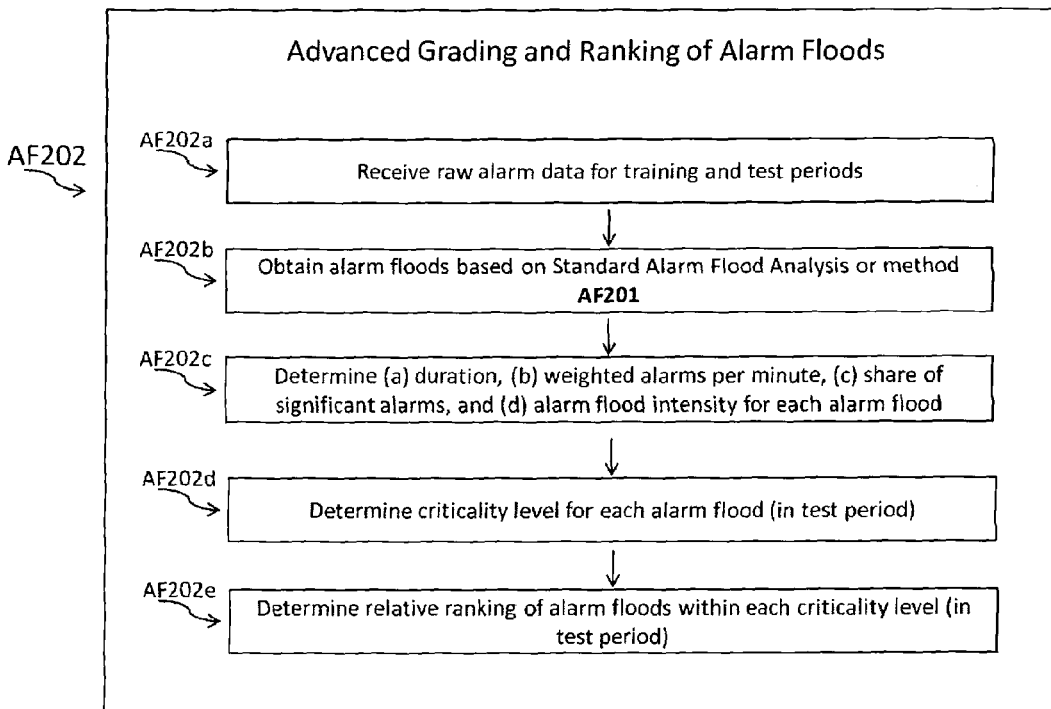
FIG. 5 schematically illustrates grading and ranking alarm floods in a given time period in the Alarm Attack Analysis method of the Alarm Fitness system.

I.B. Alarm Flood and Alarm Attack Analysis:

The "Finer Alarm Flood and Alarm Attack Analysis," component AF200 of the Alarm Fitness system, comprises: at least the two identified parts regarding the Finer Flood Analysis and the Alarm Attack Analysis, each having specific elements as set forth in FIGS. 4 and 5, respectively. But stepping back, historically "standing alarms" refer to those alarms which are active at any time. The concept of a "standard alarm flood" analysis is known in the art and has been in practice for several years. According to its definition by EEMUA (Engineering Equipment & Materials Users' Assoc.), an "alarm flood" is defined as beginning when 10 or more alarms occur in a 10 minute period, and ending when less than 5 alarms occur in a 10-minute period. The "Finer Flood Analysis" (FFA) method, AF201 (illustrated in FIG. 4), performs an accurate analysis of alarm flood conditions (which refer to conditions when several alarms are generated or flood in a short period of time).

I.B.1 Finer Flood Analysis:

Accordingly, for the AF201 analysis, an alarm "flood" begins when at least $X_1$ alarm activations occur in less than (or equal to) $Y_1$ minutes (see step AF201b of FIG. 4); and the flood ends when $X_2$ alarms occur in more than $Y_2$ minutes (see step AF201c of FIG. 4). Here, the values of $X_1$, $X_2$ and $Y_1$, $Y_2$ are integers chosen between [5, 20]. Typical examples used in operations are $X_1$=10, $X_2$=5 activations, and $Y_1$=10 minutes, $Y_2$=10 minutes.

Typically during alarm floods, plant/facility operators get less than 1 minute to attend to an alarm (based on the above definition). When important alarms occur during these periods, there is an increased likelihood that the operators might miss those alarms, or fail to pay attention to one specific alarm. Consequently, the potential for the occurrence of adverse incidents typically increases during alarm flood conditions.

For example, an illustrative comparison is provided to show the results of a Standard Alarm Flood analysis (prior art), as compared with the results using the AF201 methods for a period of 3.5 months for an typical industrial plant:

| Standard Alarm Flood Analysis | Finer Flood Analysis |
|---|---|
| Number of floods = 66 | Number of floods = 124 |
| Mean time of flood = 20.7576 min | Mean time of flood = 26 min |
| Mean inter-arrival for floods (hrs) = 32.83 | Mean inter-arrival time for floods (hrs) = 17.63 |
| Longest flood = 100 min | Longest flood = 237 min |
| % of major floods | % of major floods |

| Standard Alarm Flood Analysis | Finer Flood Analysis |
|---|---|
| (# alarms >30) = 18.18 | (# alarms >30) = 18.5 |
| Avg. number of alarms in flood = 27.3939 | Avg. number of alarms in flood = 25 |
| Total number of alarms in floods = 1808 | Total number of alarms in floods = 3093 |
| Percent of alarms in floods = 5.5761 | Percent of alarms in floods = 9.5 |
| % of time alarm system in flood condition = 1.0276 | % of time alarm system in flood condition = 2.4 |

Note that EEMUA recommends that the percent of time an alarm system is in flood condition should be less than 1%. It is observed that in the standard prior art alarm flood analyses, in most cases, the number and impact of alarm floods is under-estimated in a given system. Nevertheless, in the above example, the AF201 analysis detected 87.9% more alarm floods in the study period of 3.5 months, as compared to that of standard alarm flood analysis. Also, the percent of time alarm system was in flood condition during the study period estimated by the AF201 analysis was nearly 2.4 times that of the standard alarm flood analysis, reflecting the fact that the actual alarm flood conditions occurred both more frequently, as well as for longer periods of time, than what was identified by the standard alarm flood analysis. This also means that in reality, the plant/facility operators were busier trying to correct the alarm situations, than what was identified by the standard alarm flood analysis.

In fact, an accurate analysis of alarm flood conditions is important for a variety of other reasons. Typically, the manpower in a control room (mainly control panel operators) is adjusted according to the expected alarm frequency load in a shift. If the alarm flood conditions are under-estimated, the plant/facility's manpower is respectively likely to be insufficient, which would increase the potential occurrence of adverse incidents. Moreover, the time periods with a high frequency of alarms, relevant to acceptable alarm levels of the plant or facility operation, need to be identified accurately so that the devices controlling the alarms are tuned to the right settings.

Thus, a utility of the AF201 analysis in FIG. 4 is that the analysis helps detect alarm floods which cannot be detected by standard alarm flood analyses. More specifically, as compared to such standard alarm flood analysis as are available in the prior art, in most cases, (a) the AF201 analysis detects a higher percentage and number of alarm floods in a given time period, (b) most floods detected by the AF201 analysis last longer than the comparable findings, and (c) the AF201 analysis found that the floods happen more frequently than were previously expected. This analysis applies to any group of alarms, ranging from total alarms in a given unit/plant or facility to a select group of alarms.

Notably the standard prior art flood analysis depends totally on the starting point of the 10-min interval. In other words, based on the time at which the 10-min period starts (e.g. on the hour, or 1-min past the hour), different results are obtained.

I.B.1.a. Advanced Grading and Ranking of Alarm Floods:

A method AF202 is illustrated in FIG. 5 to grade and rank the alarm floods in a given time period (e.g., days, weeks, months, custom time period), also referred as "test period." The grading and ranking of alarm floods help plant/facility personnel prioritize the alarm floods, so that operators can focus and address the alarms that contributed the most to the occurrence of the important alarm floods. These criteria are used individually or in any combination. Also, this analysis applies to all the alarms or a subset of alarms.

Step AF202c consists at least of evaluation of the following four criteria for each alarm flood:

1. Duration of alarm flood: The longer the duration, the more critical alarm flood is to the system.
2. Weighted alarms per minute: In most plants/facilities, alarms are prioritized by plant/facility personnel during the commissioning of the plant or facility. This process is intended to help the operators address the more important alarms first during any urgent situation. Because there are often hundreds of alarms for a given process in the plant/facility, the alarms are typically prioritized into three categories—high-priority, medium-priority, and low-priority. The categorization determination into at least 2 or more groupings, is done by the plant/facility owners or operators. The categorization is set forth in the data that is provided to the current analyses. The invention does not prioritize the alarms, nor does the invention control or name the categories of alarms selected by the plant/facility owners or operators in association with the alarm priority of response; rather that is reflected in the alarm data that is provided.

Typically, the top 5-10% most important alarms relative to plant/facility operation are referred as "high-priority." The next 20-30% of the alarms is typically designated by the plant/facility to be of "medium-priority," and the remaining are considered by the plant/facility to be "low-priority" alarms. Conversely, if for a particular plant/facility, no priorities have been defined for the alarms, in the present calculations all alarms are treated equally. However, when the alarms have be divided into predetermined categories, such as high, medium and low, weighting factors are introduced for different categories of alarms, e.g., weighted alarms/min=$w1$*(High-priority alarms/min)+$w2$*(Medium-priority alarms/min)+$w3$*(Low-priority alarms/min), where, $w1$, $w2$, and $w3$ are the weighting factors. Weighted alarms/min equals Total alarms/min. Typical values are $w1:w2:w3=5:3:1$. And as a result, the higher the number of weighted alarms per minute for an alarm flood, the more critical each alarm is in the system.
3. Share of significant alarms: This criterion is based on percentage of significant alarms in a flood, i.e., 100*(Total significant alarms)/(Total alarms). "Significant alarms" are predetermined by the plant/facility owners or operators based upon the operations. However, significant alarms to a particular operation typically consist of all of or a select percentage of the high-priority and medium-priority alarms.
4. "Alarm Flood Intensity" or Average number of "fresh standing alarms" at any time: "Fresh standing alarms" are defined as those alarms, which are active for less than 24 hours, or alternatively as for any fixed time period between 3 hrs and 48 hrs. This is an important measure for understanding the intensity of "fresh standing alarms" in an alarm flood, and is used to compare the criticality/importance of different alarm floods. This fourth criterion is based on average number of "fresh standing alarms" at any time during the alarm flood. The higher the alarm flood intensity for an alarm flood, the more critical each is to the system.

Calculation Steps for "Alarm Flood Intensity":

For the duration of an alarm flood, the numbers of "fresh standing alarms" at select time intervals are obtained. Next, their average over the alarm flood period is calculated by summing the numbers of "fresh standing alarms" at select time intervals and dividing the sum by the total number of time intervals during the alarm flood. This value provides the "alarm flood intensity" for the alarm flood in consideration. The smaller the select time interval is, the more accurate the alarm flood intensity value becomes. For example, consider an alarm flood that lasts 10 minutes or 600 seconds. First, the numbers of "fresh standing alarms" at every second during the 10-min period are obtained from the alarm data. Second, these numbers are added to obtain the 'total.' Finally, the 'total' is divided by 600 (total number of time intervals during the alarm flood) to obtain the alarm flood intensity for this flood.

I.B.1.b. Determining Criticality Levels for Alarm Floods on an Absolute Scale (Step AF202d):

Using the above four criteria, various criticality levels can be defined to characterize the alarm floods on an absolute scale. Herein, the following three criticality levels are recommended: '$\Delta_3$,' '$\Delta_2$,' and '$\Delta_1$.' See definitions below.

Method of Calculation for Criticality Levels:

First, a training period is selected, and alarm floods in that period are identified. The recommended range for a training period is 1 month to 2 years, typically 6 months. Next, for each of the alarm floods, the above-identified four criteria are calculated. Then, for each of the four criteria, different percentile levels (e.g., 25th, 50th, 60th, 70th, 75th, 90th, etc.) are determined from the values for all the alarm floods during the training period.

The following are the steps in determining a criticality level for an alarm flood (in test period).

Classify a flood as $\Delta_3$, if the value of each criterion associated with that flood is above $X_3$th percentile of the values for that criterion calculated using the training period (as explained above). Here, the value of $X_3$ ranges between [50, 100)—typical value is 75.

Classify a flood as $\Delta_3$, if the value of any criterion associated with that flood is above $X_4$th percentile of the values for that criterion calculated using the training period. Here, the value of $X_4$ ranges between [$X_3$+10, 100)—typical value is 90.

Classify the remaining floods as $\Delta_1$ alarm floods.

Relative Ranking of Alarm Floods within a Given Criticality Level (Step AF202e):

The following describes the steps to determine the relative ranks of alarm floods within a given criticality level (for example, $\Delta_3$, $\Delta_2$, or $\Delta_1$) as defined above. First, list all alarm floods for a given criticality level. Then, prepare a list of floods in a decreasing order for each of the four criteria. The floods are ordered in decreasing order of their values determined per criterion calculations described above. Then assign ranks to the floods in each list, ranking the top, meaning the most critical alarm flood, as #1. Finally, to determine the relative ranking of floods within a given criticality category, a) obtain the final rank of each alarm flood by adding the four individual ranks, and b) organize the final list in ascending order.

Figure 6:
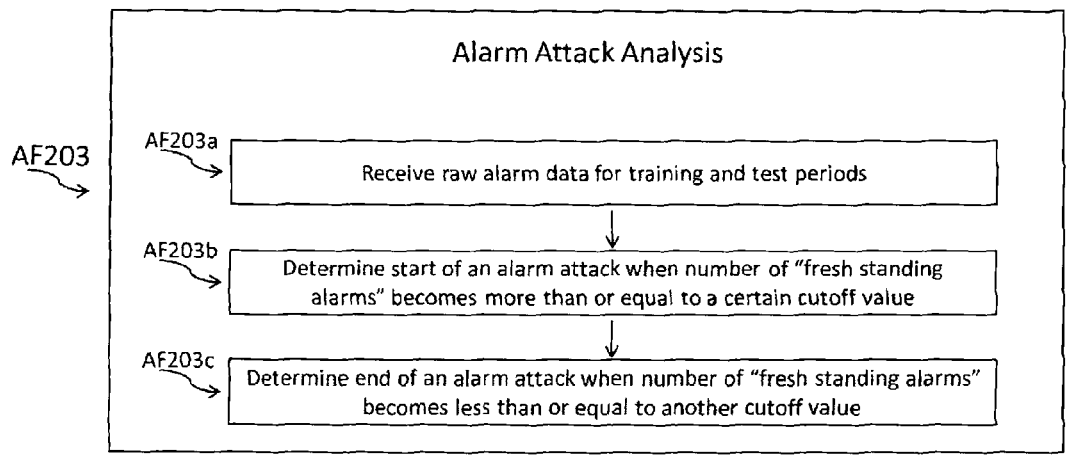
FIG. 6 schematically illustrates a method AF203 to calculate "alarm attacks" in the Alarm Attack Analysis method.

I.B.2. Alarm Attack Analysis:

A method AF203 to calculate "alarm attacks" is illustrated in FIG. 6. An "alarm attack" begins (step AF203b) when the number of "fresh standing alarms" at any time becomes $\geq X_5$ and ends (step AF203c) when the number becomes $\leq X_6$. Here, the values of $X_5$ and $X_6$ are integers chosen between [5, 20] with $X_5 > X_6$. Typical examples are $X_5=10$ and $X_6=8$. This new method identifies the periods of high intensity alarm surges (or build-ups), which overwhelm the operators and possibly cause their ability to respond to the alarm situation to decline. The utility of method AF203 is that this analysis identifies periods and frequency of alarm surges (which indicate the periods of increased potential of occurrence of incidents) and helps the plant/facility personnel to adjust the manpower and controller settings properly and regularly.

Figure 7:
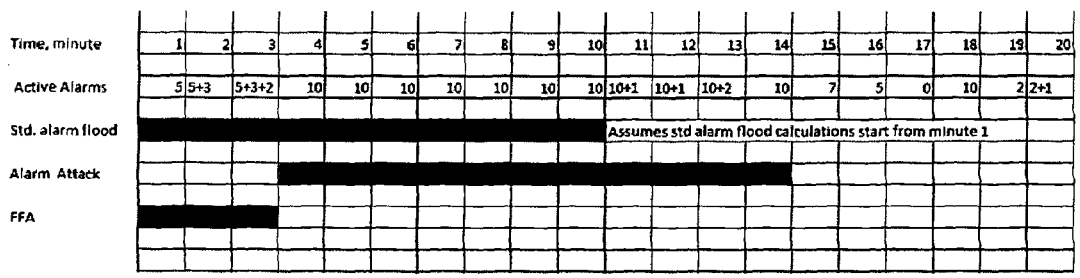
FIG. 7 graphically shows alarm attacks, finer floods and standard alarm floods for a period of 20 minutes in the Alarm Attack Analysis method.

FIG. 7 shows exemplary alarm attacks, finer floods and standard alarm floods for a period of 20 minutes. However, the figure also shows that the alarm floods and the alarm attacks have different utilities. The former identifies periods having a high rate of new alarm activations (which does not necessarily contribute to alarm build ups), while the latter identifies alarm build-ups.

Identifying alarm attacks and eliminating their occurrences is very critical to enabling the operators to focus on issues that are important to operation of the plant/facility, thereby improving the safety, productivity (operability), and quality. For example, consider an alarm attack that lasted for 15 minutes in a given day. Identifying and eliminating reoccurrence of the alarm will result in equivalent amount of productivity gained for the operators. Also, this method applies to all or select group of the alarms.

Figure 8:
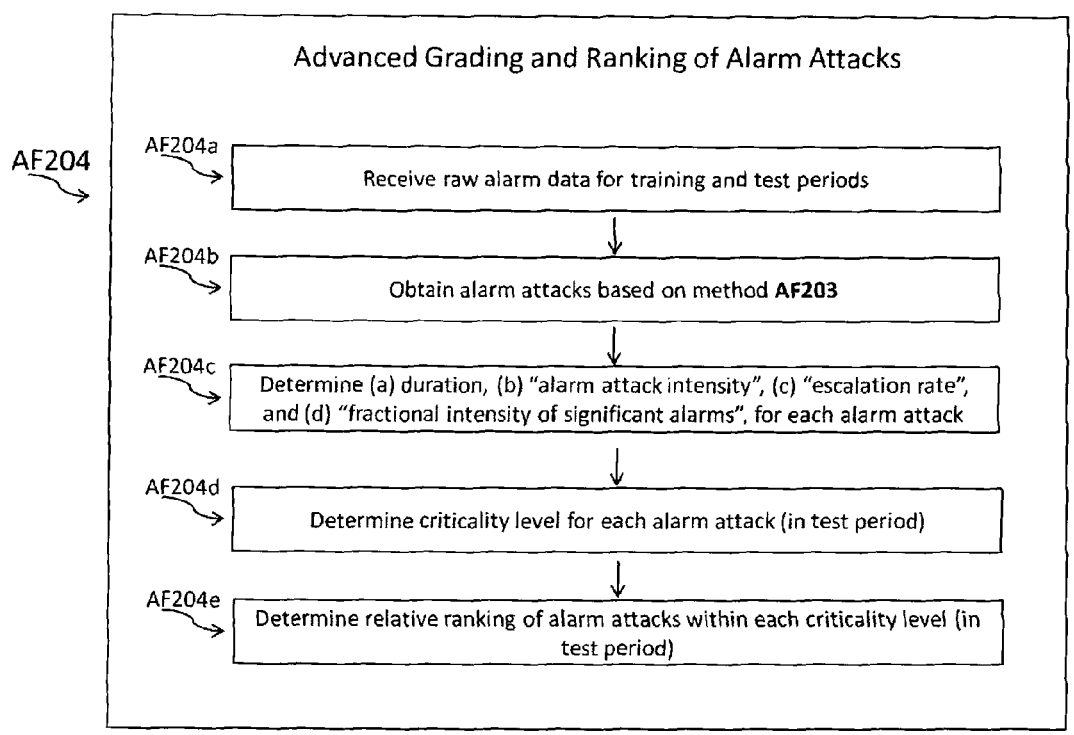
FIG. 8 schematically illustrates a method AF204 to grade and rank alarm attacks in a given time period.

I.B.2.a. Grading and Ranking of Alarm Attacks:

A method AF204 is illustrated in FIG. 8 to grade and rank the alarm attacks in a given time period (e.g., days, weeks, months, custom time period), also referred as test period. The grading and ranking of alarm attacks help the plant/facility personnel prioritize the alarm attacks, so that operators can focus and address the alarms that contributed the most to the important alarm attacks. These criteria are used individually or in any combination. As above, this analysis also applies to all the alarms or a subset of alarms.

Step AF204c of FIG. 8 consists of evaluating at least the following four criteria for each alarm flood:

1. Duration of alarm attack: The longer the duration, the more critical the alarm attack.
2. "Alarm Attack Intensity" or Average number of "fresh standing alarms" at any time: This is an important measure to understand the intensity of "fresh standing alarms" in an alarm attack and is used to compare the criticality/importance of different alarm attacks. This criterion is based on average number of "fresh standing alarms" at any time during the alarm attack. The higher the intensity for an alarm attack, the more critical the alarm(s) is to the operation of the plant/facility.

Calculation steps for "Alarm Attack Intensity":

For the duration of an alarm attack, the number(s) of "fresh standing alarms" at select time intervals are obtained. Next, their average over the alarm attack period is calculated by summing the numbers of "fresh standing alarms" at select time intervals and then dividing the sum by the total number of time intervals during the alarm attack. This value provides the "alarm attack intensity" for the alarm attack under examination. The smaller the select time interval is, the more accurate the alarm attack intensity value is in the analysis.

3. "Escalation rate": Escalation rate defines how fast the alarm attack flourishes. Following are the steps for calculating the escalation rate of an alarm attack:
   (a) Identify each of the $X_5$ "fresh standing alarms" that triggered the alarm attack.
   (b) For each of the $X_5$ "fresh standing alarms," calculate the time distance from the starting point of the alarm attack, i.e. for each of the $X_5$ "fresh standing alarms," and then using the activation time, calculate time distance from the start of the alarm attack.
   (c) Calculate the median value of all $X_5$ time distance values to obtain the "mathematical escalation rate" of the alarm attack (default case).
   (d) Or in the alternative, calculate the mean value of all $X_5$ time distance values.

Three levels of Escalation Rate are defined: Rapid (mathematical escalation rate ≤5 min), Moderate (mathematical escalation rate >5 min, but ≤15 min), and Gradual (mathematical escalation rate >15 min). For example, alarm attacks with 'Rapid' escalation rate indicate a fast build-up of alarms, indicating either progression of a disturbance or an inability of controller to resolve a process issue. In both cases, the disturbance is an adverse event requiring fast action/response by the operators, and indicating a sudden increase in the potential increased occurrence of incidents. Thus, identifying alarm attacks and eliminating their occurrences is critical to plant/facility operations.

4. "Fractional Intensity of significant alarms": This criterion is based on fractional intensity of significant alarms in an alarm attack. "Fractional intensity" is defined as 100*Intensity (significant alarms)/Intensity (Total alarms), when Intensity (significant alarms) refers to average number of "fresh standing alarms," calculated using significant alarms, at any time during the alarm attack. Intensity (Total alarms) refers to average number of "fresh standing alarms," calculated using all the alarms, at any time during the alarm attack. As with previously identified categorization tools, "significant alarms" are identified by the plant/facility owner or operators, and are specific to the operations under examination. Significant alarms typically consist of all of or at least some high-priority and medium-priority alarms.

I.B.2.b. Determination of Criticality Levels for Alarm Attacks on an Absolute Scale (Step AF204*d*):

Using the above four criteria, various criticality levels are defined to characterize the alarm attacks on an absolute scale. Here, as above, the following three criticality levels are recommended: '$\Delta_3$', '$\Delta_2$', and '$\Delta_1$' as previously defined.

Calculation Steps for Criticality Levels:

As previously described for other calculations, first, a training period is selected and alarm attacks in that period are identified. The recommended range for training period is 1 month to 2 years, typically 6 months. Next, for each of the alarm attacks, the four criteria defined above are calculated. Then, for the three criteria—duration of alarm attack, alarm attack intensity, and fractional intensity of significant alarms—different percentile levels (25th, 50th, 60th, 70th, 75th, 90th, etc.) are determined by utilizing values for all the alarm attacks during the training period.

The following steps are set forth for determining a criticality level for an alarm attack (in test period).

Classify an attack as $\Delta_3$, (a) if the value of each of the three criteria (duration of alarm attack, alarm attack intensity, and fractional intensity of significant alarms) is above the $X_7$th percentile of the values for that criterion calculated using the training data, AND (b) if its Escalation Rate is 'Rapid.' Here, the value of $X_7$ ranges between [50, 100]—typical value is 75.

Classify an attack as $\Delta_2$, (a) if the value of any of three criteria (duration of alarm attack, alarm attack intensity, and fractional intensity of significant alarms) is above $X_8$th percentile of the values for that criterion calculated using the training data, or (b) if the alarm attack Escalation Rate is 'Rapid.' Here, the value of $X_8$ ranges between [$X_7$+10, 100)—typical value is 90.

Classify the remaining attacks as $\Delta_1$ alarm attacks.

I.B.2.c. Relative Ranking of Alarm Attacks within a Given Criticality Level (Step AF204*e*):

The following describes the steps to determine the relative ranks of alarm attacks within a given criticality level (for example, '$\Delta_3$', '$\Delta_2$', or '$\Delta_1$') as defined above. First, list all the alarm attacks for a given criticality level. Then, prepare a list of attacks in a decreasing order for each of the four above identified criteria used for attack floods. The attacks are ordered in decreasing order of their values determined per criterion calculations described above. Note that for 'Escalation rate' criterion, when categories for two or more alarm attacks are the same, equal ranks are assigned. Next, assign ranks to the attacks in each list, ranking the top (most critical to operations) one as #1. Finally, to determine the relative ranking of attacks within a given criticality category: a) obtain the final rank of each alarm attack by adding the four individual ranks, and b) organize the final list in ascending order.

I.C. Abnormal Events Analysis:

In a plant/facility, the alarms are prioritized into different categories (e.g. high, medium, low) by the owners and operators who best understand their operations, to assist the operators with their decisions to prioritize their actions during upset or adverse event situations. Further, each alarm is associated with a specific alarm level, e.g., first level alarms include H1' and 'L1' alarms, second level of alarms include 112' (higher than the preset 'H1') and 'L2' (lower than the preset L1) alarms, etc, as previously described in the temperature setting of the Alarm Fitness Subsystem section, wherein the alarms are set so that they are activated when the variable reaches the identified value preset by the plant or facility using the alarms.

Definition and Calculation of an Abnormal Event:

The concept of an "abnormal event" or problem is known (see, Pariyani et al., supra, 2010a and 2010b; Pariyani, et al., *AIChE J*. 58(3):812-825 (2012a); Pariyani et al., *AIChE J*. 58(3): 826-841 (2012b)). An abnormal event begins (step AF301*b*) when a variable moves beyond a normal operating range (defined as the region within the predetermined high and low alarms), and ends when the variable returns to within the normal operating range between the alarm settings. Therefore, when an abnormal event happens, one or more alarms are triggered.

Usually, the challenge for a plant/facility operator is to analyze the one or more abnormal events (in real-time as well as periodically) and to take actions to prevent their reoccurrence. But since there are often numerous abnormal events that happen during plant/facility operations, one needs to prioritize the occurrence of the abnormal event(s), so that the most significant event(s) can be addressed first. Depending upon the highest level of alarm(s) associated with the abnormal event, three criticalities have been defined in the literature (Pariyani et al., supra, 2010a and 2010b; Pariyani et al., supra 2012a and 2012b), as follows: (a) "least-critical abnormal events" that cross the H1/L1 alarm thresholds, (b) moderately-critical abnormal events that cross H2/L2 alarm thresholds, and (c) most-critical abnormal events that cross the ESD thresholds. However, these definitions of criticality take only the level of alarms into account. The definitions do not take into account the priority of alarms.

For example, consider an abnormal event that crosses a H1 alarm level associated with Variable A, and assume that the priority of this H1 alarm level is LOW. Also consider another abnormal event that crosses a H1 alarm level associated with Variable B, and assume that the priority of this H1 level is HIGH. According to preceding definition, both the abnormal events are thus referred as "least-critical abnormal events." However, their actual criticalities with respect to the process are not the same—in fact, the latter is much more critical than the former. This shortcoming is addressed by the present method of determining "scale of abnormal events" as follows.

Figure 9:
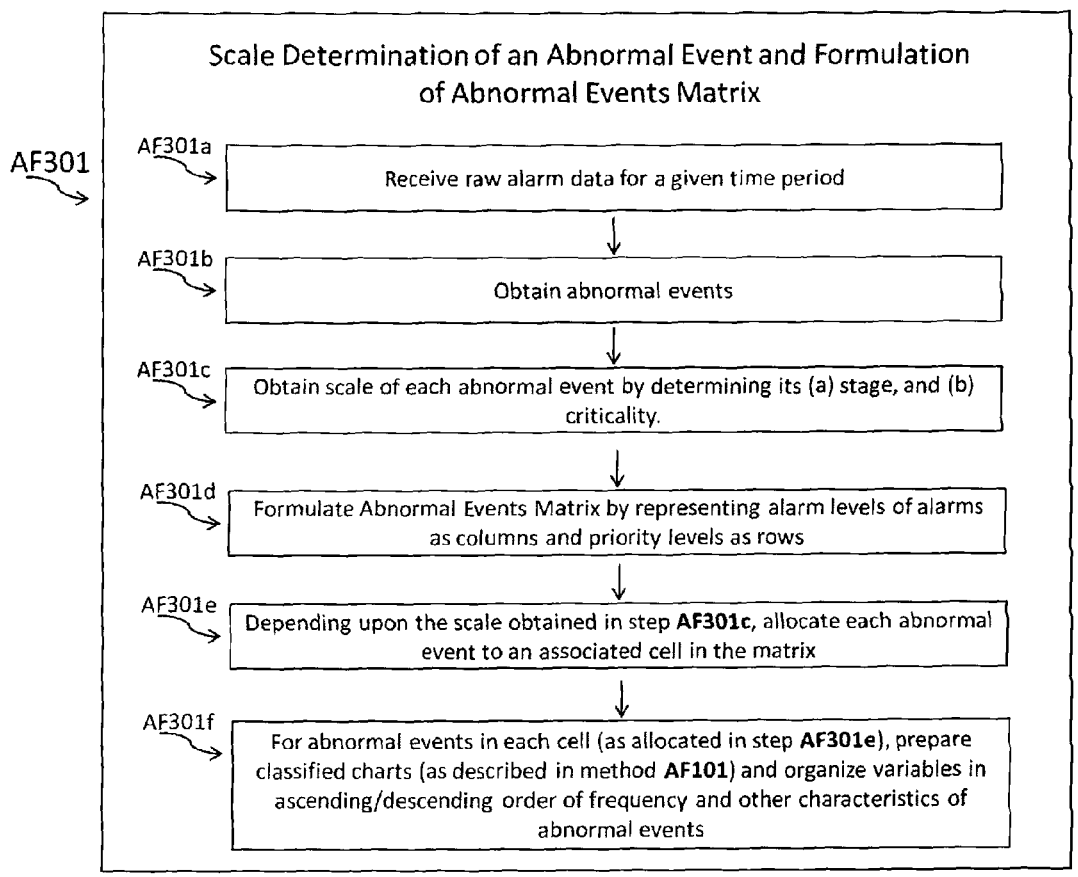
FIG. 9 schematically illustrates a method AF301 to determine scale of an abnormal event, and to formulate an abnormal events matrix.

I.C.1. Scale Determination of an Abnormal Event and Formulation of Abnormal Events Matrix:

First, for each abnormal event, a method AF301 to determine "scale" of an abnormal event and to formulate "abnormal events matrix" is presented in FIG. 9. The "scale" of an abnormal event (step AF301*c*) is defined by its two components: (a) Stage of the abnormal event; and (b) Criticality of the abnormal event. "Stage" of an abnormal event is defined by level of the "outermost alarm," activated during the abnormal event. An "outermost alarm" refers to the highest alarm level crossed by a variable during an abnormal event. For example, consider FIG. 12, in which like sound waves progressing outward from the source, the variable crosses both its H1 and H2 alarm levels during an abnormal event. In that situation, the outermost alarm is its H2 alarm. If the variable had only crossed its H1 alarm, then its outermost alarm would only be the H1 alarm. "Criticality" of an abnormal event is defined by priority of the outermost alarm that is activated during the abnormal event.

In accordance with step AF301*d*, in FIG. 9, the columns of "Abnormal Events Matrix" are the different possible levels of outermost alarm (activated during the abnormal events). The rows of the FIG. 10 matrix represent the different possible priorities of the outermost alarm (as activated during the abnormal events). Therefore, the cells of this matrix indicate the different scales of abnormal events.

The concept of the Abnormal Events Matrix extends the earlier categorization of abnormal events (based on 'levels of alarms') to include the second dimension of the 'priority of alarms' (assigned by plant/facility personnel based on the characteristics of variables with which the alarms are associated). The matrix helps prioritize the different kinds of abnormal events, so that the most significant alarm events can be addressed first.

The number of columns and rows of the matrix are determined by the characteristics of the alarm system. Accordingly, the following specific example is provided to demonstrate the Abnormal Events Matrix method.

Figure 10:
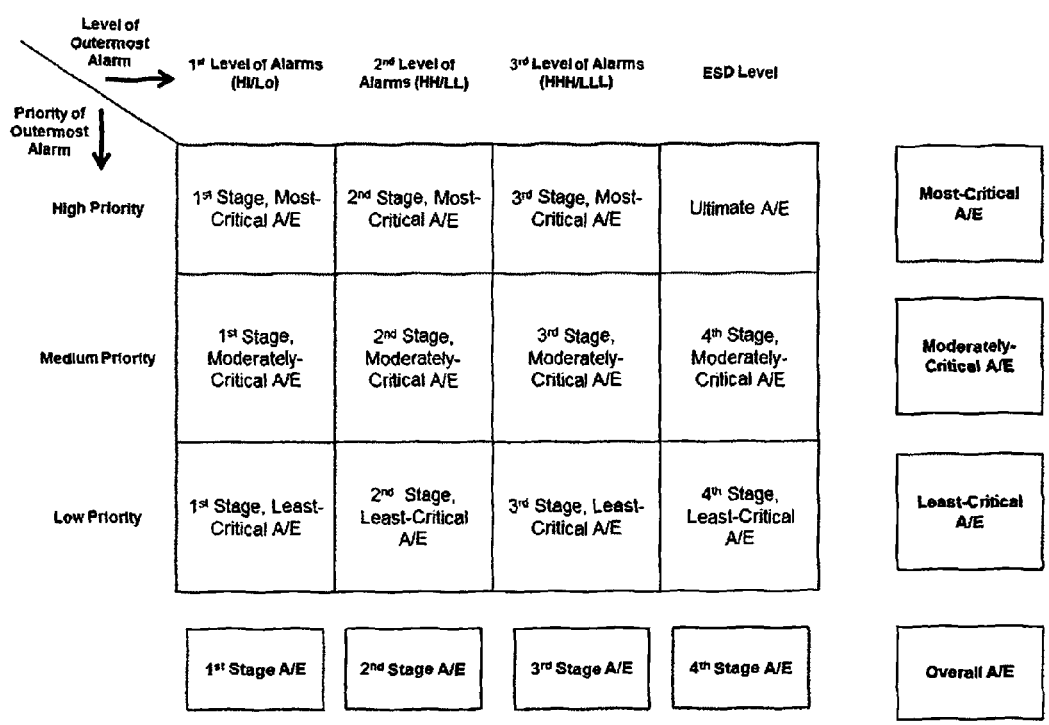
FIG. 10 graphically shows a 3×4 Abnormal Events matrix constructed to provide an example having the identified 4 levels of alarms as columns, and the 3 priorities of alarms ("High," "Medium," and "Low") as the rows. Consequently, 12 scales of abnormal Alarm events are defined and represented by the 12 cells of the matrix.

A 3×4 Abnormal Events matrix is constructed (as shown in FIG. 10), representing the previously identified 4 levels of alarms as columns, and in this case, 3 priorities of alarms ("High," "Medium," and "Low") are the rows. Consequently, 12 scales of abnormal Alarm events are defined and represented by the 12 cells of the matrix. The top row (all cells) indicates the "most-critical abnormal events" (of all stages), middle row (all cells) indicates the "moderately-critical abnormal events" (of all stages), and bottom row (all cells) indicates the "least-critical abnormal events" (of all stages). The left column (all cells) indicates the 1st stage abnormal events (of all criticalities); the column 2nd from left (all cells) indicates the 2nd stage abnormal events (of all criticalities); the column 3rd from left (all cells) indicates the 3rd stage abnormal events (of all criticalities); and the column 4th from left (all cells) indicates the 4th stage abnormal events (of all criticalities). Thus, within a row, the 'scale' of abnormal events increases from left to right; whereas within a column, the 'scale' of abnormal events increases from bottom to top. See, FIG. 10.

As discussed above in the subsection relating to "classified charts," "abnormal events charts," as in FIG. 3 are prepared to display the frequency of abnormal events (of any scale) over a given time period. These abnormal events charts are prepared for frequencies in different time intervals (1-min, 10-min, hourly, daily, weekly, biweekly, monthly, etc.) and for all the variables as well as select group of variables. Thresholds are calculated for at least a "Normal Operations Zone" (or band), a "Moderate Frequency Zone" (or band), and an "Extreme Frequency Zone" (or band). The threshold boundaries, as defined above in the Classified Charting, between the Normal Operations Zone and the Moderate Frequency Zone, and between the Moderate Frequency Zone and the Extreme Frequency Zone, for classified abnormal event frequency charts are obtained using the formulas presented above.

Organization of Variables Based on Scales of Abnormal Events:

For each cell in the matrix, lists of variables are prepared based on different criteria such as frequency of abnormal events, time segment, combinations of criteria, etc. These lists are prepared for all the variables, or for a select group of variables, for different time intervals (days, weeks, months, etc.).

Definition of Ultimate Abnormal Events:

If any variable crosses its ESD level, without resulting in a shutdown, the associated abnormal event is defined as an "ultimate abnormal event." In the example presented above in association with FIG. 10, the 4th stage most-critical abnormal events are also ultimate abnormal events. It is important for plant/facility personnel to minimize the occurrence of ultimate abnormal events, as the events are precursors to shutdowns or adverse incidents at the plant/facility. Tracking ultimate abnormal events for different time periods helps compare the safety performance of a given unit from one time period to another.

Figure 11:
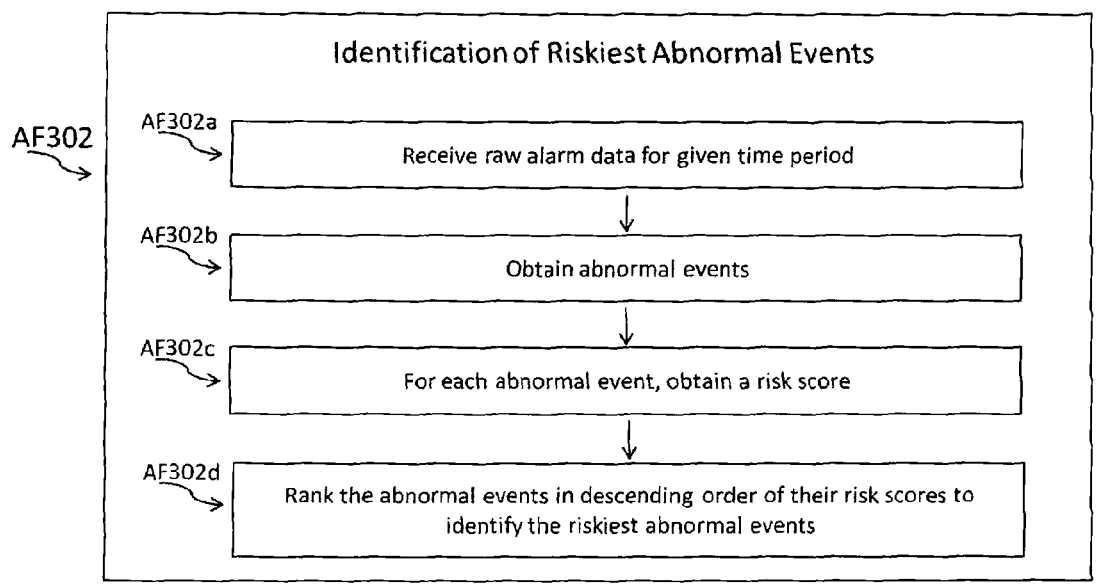
FIG. 11 schematically illustrates a method AF302 to identify the riskiest abnormal events within a given time period and/or the riskiest abnormal events for a group of variables, within a time period.

I.C.2. Identification of Riskiest Abnormal Events:

A method AF302 to identify the riskiest abnormal events in a given time period (shift, daily, weekly, monthly) is schematically illustrated in FIG. 11. This is used to identify (a) riskiest abnormal events for a given variable, within a time period, and/or (b) riskiest abnormal events for a group of variables, within a time period. This helps the plant/facility personnel to prioritize the abnormal events and focus first on the ones that are most important to safety or operation.

For each abnormal event, a "risk score" (step AF302*c*) is defined as a function of its characteristics, such as time spent beyond its alarm levels, highest value attained by the variable during the abnormal event, etc. For example, for a 2nd stage abnormal event shown in FIG. 12, a recommended form of risk score is $w_1*t_1 + w_2*t_2$, where $t_1$ and $t_2$ denote times spent beyond $1^{st}$ and $2^{nd}$ alarm levels, and $w_1$ and $w_2$ refer to weighting factors indicating the relative importance of the times. Their typical values are 10 and 1. A higher value "risk score" indicates a riskier abnormal event; "risk" assumes its normal meaning as relevant to one or more liabilities to the safety of the plant/facility operators or to others, or to the effectiveness and efficiency of operation(s). Note that for two abnormal events for which values of $t_2$ are equal, the one which has higher value of $t_1$ is riskier. On the other hand, when values of $t_1$ are equal and $t_2$ are unequal, the value having a higher $t_2$ also carries the higher risk.

Also, note that when a group of variables is considered, weighting factors are assigned among the risk scores—with higher values for important variables. Then, a list of abnormal events in decreasing order of their risk scores is prepared to identify the riskiest abnormal events in a given time period (see step AF302*d* of FIG. 11).

Figure 12:
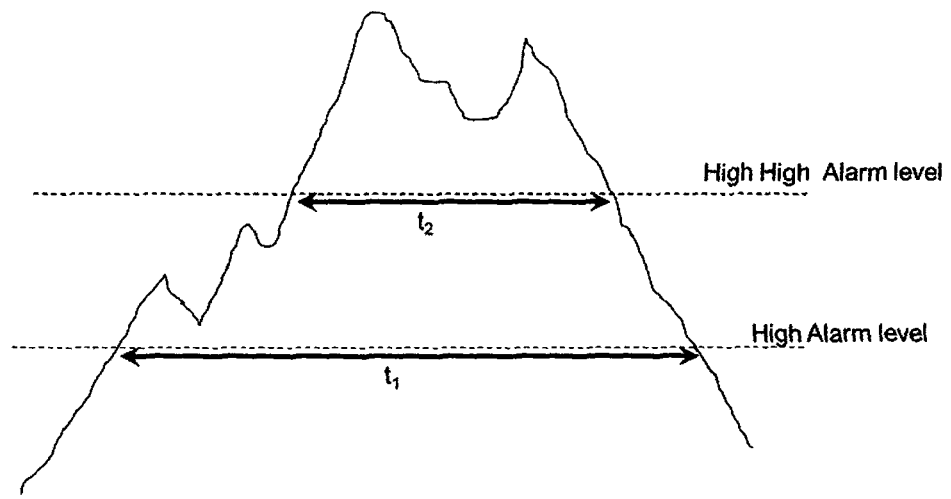
FIG. 12 diagrammatically depicts scale determination of a typical abnormal event and a corresponding abnormal event matrix, wherein one peak is above the H2 alarm level. Scale of an abnormal event is defined in terms of stage of the abnormal event and criticality of the abnormal event.

For higher stage abnormal events like $3^{rd}$ stage and $4^{th}$ stage abnormal events, a sum of the recovery times associated with outer two or more alarm levels ("outer" being in terms of rank shown in FIG. 12) is used as "risk score," e.g., consider an abnormal event which has crossed H1/L1, H2/L2, and H3/L3 alarms (if such addition levels were designated) and has spent $t_1$, $t_2$, and $t_3$ times, respectively (note than an additional level $t_3$ is assumed for time in this example as compared to FIG. 12). The risk score for the exemplified abnormal event is calculated as $w_3*t_3+w_2*t_2$ or $w_3*t_3+w_2*t_2+w_1*t_1$. In the alternative, the risk score is calculated using other selected combinations/functional relationships of $t_1$, $t_2$, and $t_3$ (functional relationship containing any two or more of the times involved).

Figure 13:
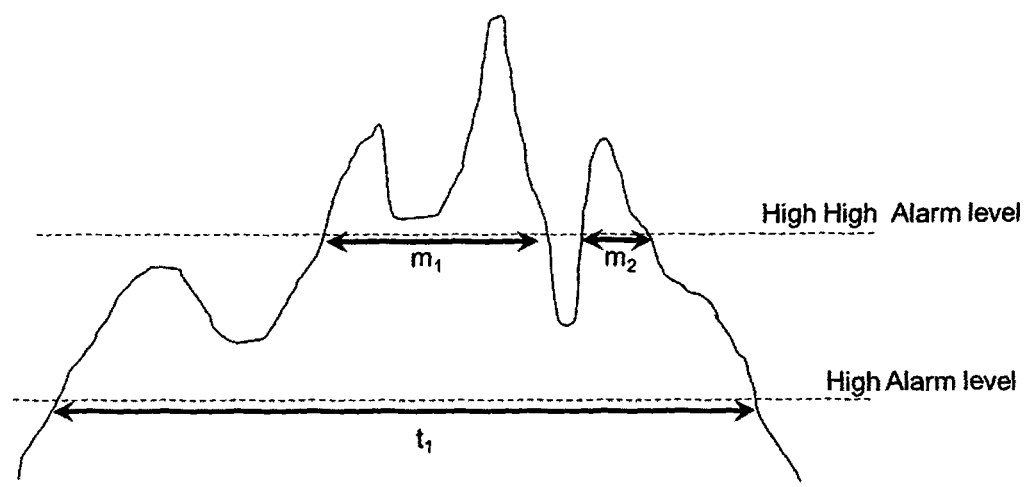
FIG. 13 diagrammatically depicts another typical abnormal event, wherein there are two peaks above the H2 alarm level. Total time above the H2 alarm level, denoted by $t_2$, equals $m_1+m_2$, wherein $m_1$ is time spent by variable above the H2 alarm level during its first peak, and $m_2$ is time spent by variable above the H2 alarm level during its second peak. $t_2$ is used in the risk score calculations.

For example see also FIG. 13, wherein $t_2$ is shown as the sum of $m_1$ and $m_2$. In the case of the score presented in FIG. 13, there are two peaks above the H2 alarm level. Total time ("$t_2$") above the H2 alarm level, equals $m_1+m_2$, wherein $m_1$ is time spent by variable above the H2 alarm level during its first peak, and $m_2$ is time spent by variable above the H2 alarm level during its second peak. The term $t_2$ is used in the risk score calculations.

This method permits grading of different variables based on the abnormal events within a particular time period. For example, if there were 200 variables in a plant/facility, and over a period of last 6 months, each of them experienced hundreds of abnormal events, it would be advantageous if those variables could be graded. To do so, the AF303 method takes into account all the abnormal events, and calculates an overall "combined risk score" by combining the individual risk scores for each abnormal event, and then prepares a list of variables by arranging them in descending order by way of their "combined risk scores."

Figure 14:
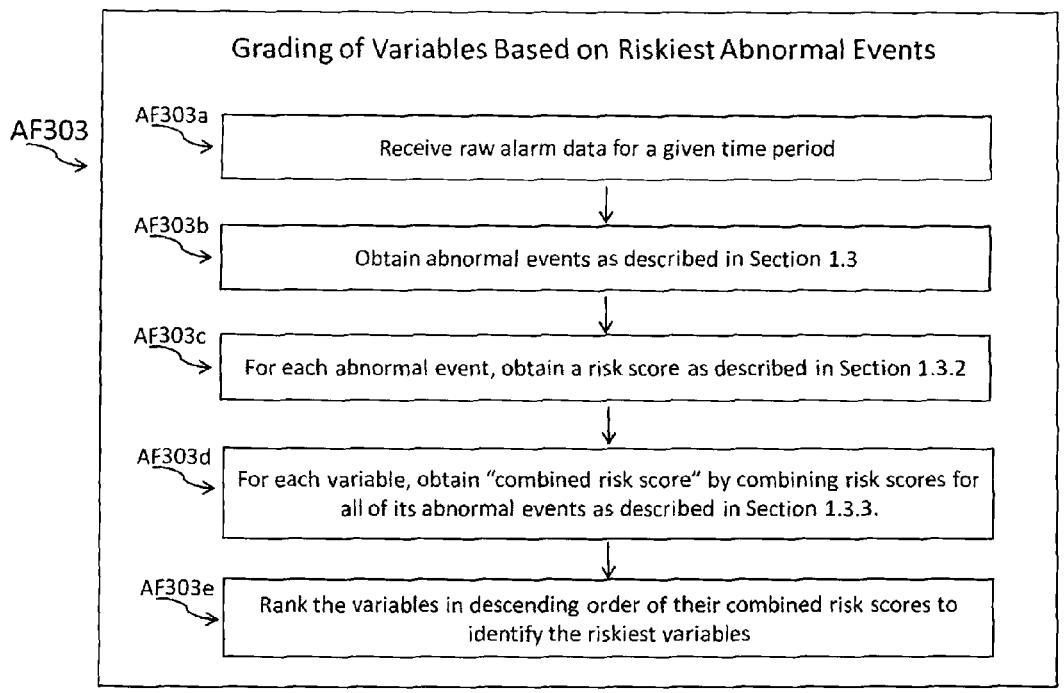
FIG. 14 schematically illustrates a method for grading of variables based on riskiest abnormal events to determine a combined risk score.

I.C.3. Grading of Variables Based on Riskiest Abnormal Events:

A method AF303 is illustrated in FIG. 14 to determine a "combined risk score" for one or more variables by combining the individual risk scores for each different type of abnormal event (2nd stage, 3rd stage abnormal events, etc., as stages are seen and described with regard to FIG. 10). The combination is accomplished using multiplication, or addition, or by other formulations, although typically, addition is used. Then, lists of variables are prepared based upon decreasing Combined Risk Score for a given time period.

I.D. Time Segment Analysis

Various time segment analyses are conducted based on the times, when an alarm is activated, and when it inactivates or is deactivated. Commonly used calculations are:

Recovery time: Time between an alarm activation and its subsequent inactivation or deactivation, wherein the time is defined for each alarm level.

Inter-arrival time: Time between consecutive alarm activations at each alarm level. This term is also referred to as "time between alarms" or "distance between alarms."

Figure 19:
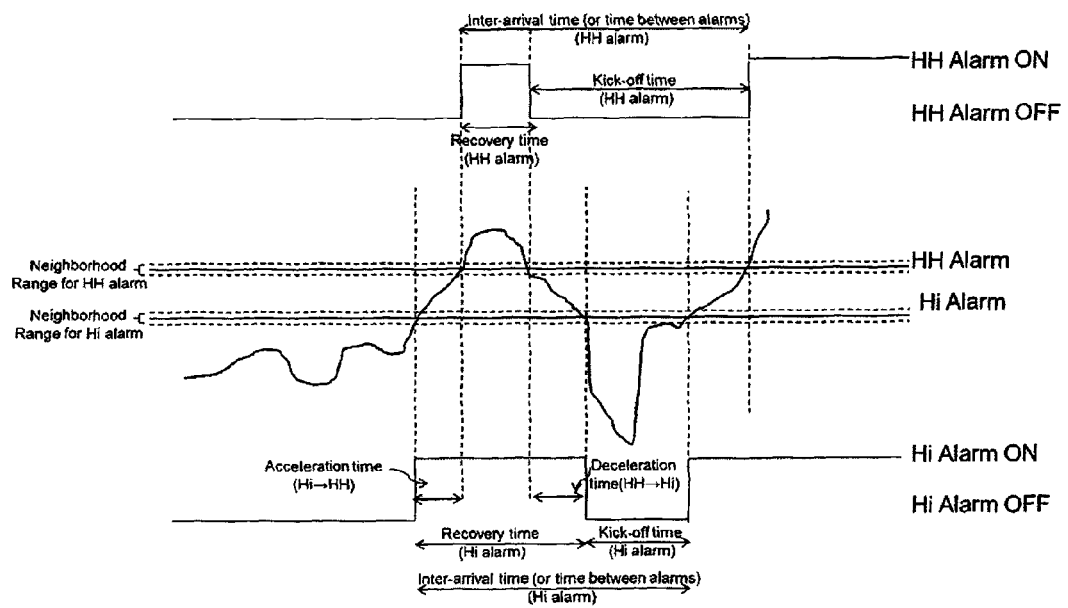

The time-segment analysis methods, as used alone or in any combination, either with each other, or in combination with previously known methods, are schematically shown in FIG. 19.

Figure 15:
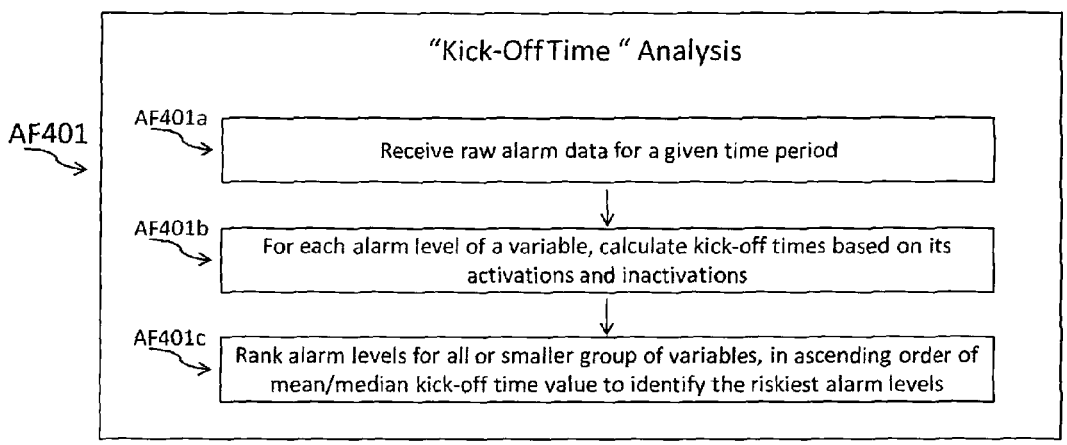
FIG. 15 schematically illustrates a method AF401 to identify the riskiest alarm levels based on kick-off time analysis.

I.D.1. "Kickoff Time" Analysis:

"Kick-off time" is defined as the time elapsed from the last inactivation of an alarm to its next activation. It is defined for each alarm level. A method AF401 to identify the riskiest alarm levels based on kick-off time analysis is illustrated in FIG. 15.

Figure 16:
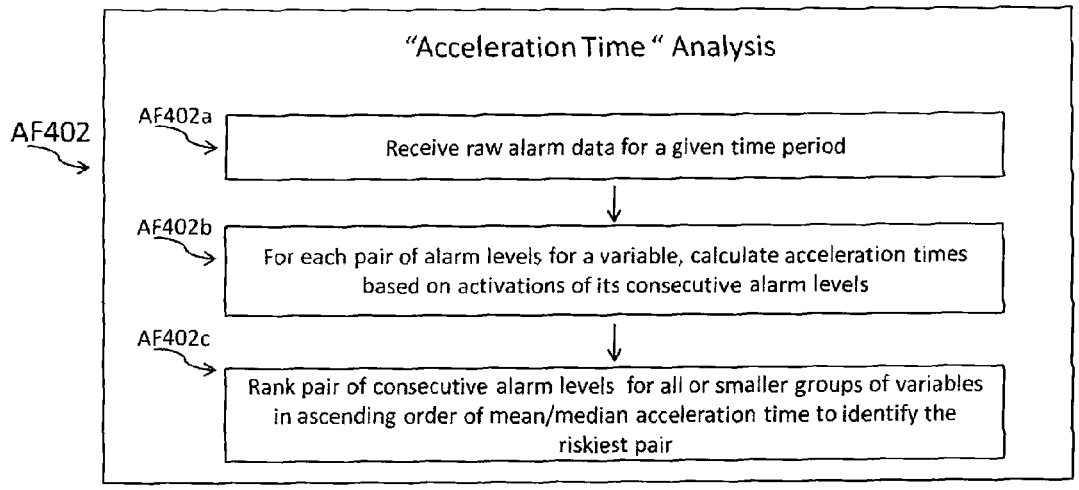
FIG. 16 schematically illustrates a method AF402 to identify the riskiest consecutive pair of alarm levels based on acceleration time analysis.

I.D.2. "Acceleration Time" Analysis:

"Acceleration time" is the time difference between alarm activations of two consecutive alarm levels that belong to the same variable. Thus, for a variable having 3 layers of alarms (ranging from H1 to L1, from H2 to L2, and from H3 to L3), four sets of acceleration times are defined—for H1 to H2, L1 to L2, H2 to H3, and L2 to L3. A method AF402 to identify the riskiest consecutive pair of alarm levels based on acceleration time analysis is illustrated in FIG. 16.

Figure 17:
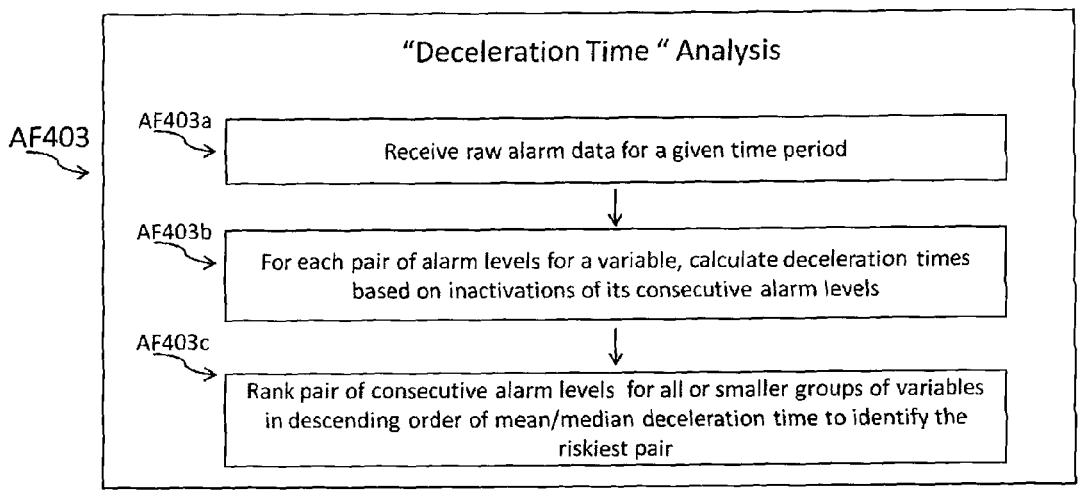
FIG. 17 schematically illustrates a method AF403 to identify the riskiest consecutive pair of alarm levels, based on a deceleration time analysis.

I.D.3. "Deceleration Time" Analysis:

"Deceleration time" is the reverse of acceleration time, that is, "deceleration time" is the time difference between inactivations or deactivations of two consecutive alarm levels that belong to the same variable. Thus, for a variable having 3 layers of alarms (ranging from H1 to L1, from H2 to L2, and from H3 to L3), four sets of deceleration times are defined—for H3 to H2, L3 to L2, H2 to H1, and L2 to L1. A method AF403 to identify the riskiest consecutive pair of alarm levels based on deceleration time analysis is illustrated in FIG. 17.

Figure 18:
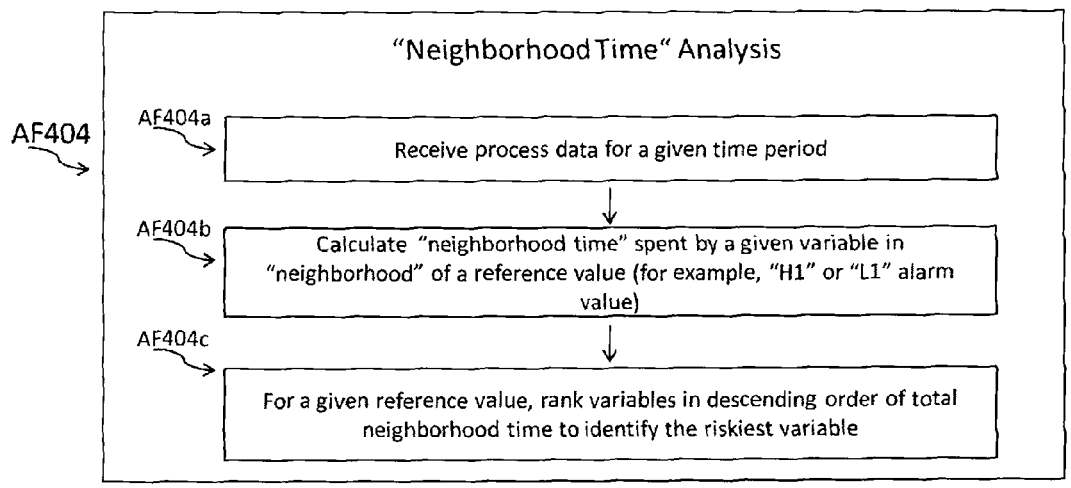
FIG. 18 schematically illustrates a method AF404 to identify the riskiest variables based on a "neighborhood time" analysis FIG. 19 diagrammatically depicts the time segments and the riskiest relationships, showing that the time segments represent different characteristics of the alarms and variables.

I.D.4. "Neighborhood Time" Analysis:

"Neighborhood time" is the total time the value of a variable in close proximity of a referenced value. For alarm data analysis, reference value is typically taken as the alarm(s) set value for the given variable. The range of proximity is (0, ±20]% of the alarm set value referred to as "close proximity," is also considered to be the "neighborhood" of the alarm value. Typically the value is ±5% of the referenced value. Thus, "neighborhood time" is defined for each alarm level associated with a given variable. A method AF404 to identify the riskiest variables based on "neighborhood time" analysis is illustrated in FIG. 18.

While FIG. 19 graphically depicts the time segments and relationships discussed above, it can be seen that the above-mentioned time segments signify different characteristics of alarms and variables. The utility of the time segment methods is that they identify the important alarms and variables that need to be rapidly addressed by the plant/facility maintenance.

I.D.5. "Effective Value" Analysis:

The "effective value" of an entity is its current value modified to account for its relative increase or decrease with respect to its long-term moving average. "Effective value" of an entity is defined as (Actual Value of Entity)*(Relative Change), where, $$\text{Relative Change} = \frac{\text{Actual value of entity}}{\text{a Long-term moving average of entity}} \quad \text{[Equation 1]}$$

In this calculation $\alpha$ is a proportionality constant, anywhere between (0, 2]—typically equal to 1.

For a given time period, the following variations of effective values are defined when, n lies in [0, 100]—typical value being 90. Average value is written "avg" for simplicity; median is written "med."

$$\text{Effective } avg \text{ value of entity} = (\text{Actual } avg \text{ value}) * \frac{\text{Actual average value of entity}}{\text{a Long-term moving average of entity}} \quad \text{[Equation 2]}$$

$$\text{Effective } med \text{ value of entity} = (\text{Actual } med \text{ value}) * \frac{\text{Actual median value of entity}}{\text{a Long-term moving average of entity}} \quad \text{[Equation 3]}$$

$$\text{Effective } n^{th} \% \text{ } ile \text{ of entity} = (\text{Actual } n^{th} \% \text{ } ile) * \frac{\text{Actual } n^{th} \text{ percentile value of entity}}{\text{a Long-term moving average of entity}} \quad \text{[Equation 4]}$$

Figure 20:
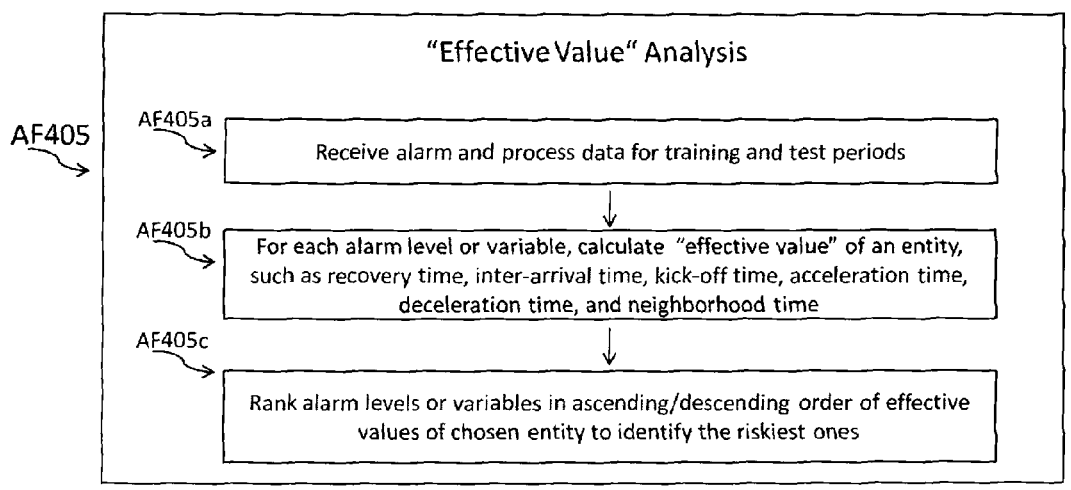
FIG. 20 schematically illustrates a method AF405 to identify the riskiest alarm levels or variables based on an "effective value" analysis.

For alarm data analysis, a method AF405 to identify the riskiest alarm levels or variables based on "effective value" analysis is illustrated in FIG. 20. By using "effective time segments" as the ordering/arranging criteria, the alarms or variables that deviate most from their normal operations are identified, permitting identification of the riskiest alarm and variables based on that characteristic. An "effective time segment" is defined as a product of actual value of time segment and the associated relative change, which is proportional to the actual value of the time segment divided by its long-term moving average value. "Long-term moving average" is a known term used in literature, and is typically defined for sequence of data, recorded with a certain frequency. For the above-identified time segments, the "effective time segments" can be obtained using the above equations.

Effective Risk Score of an Abnormal Event:

Based on the concept of "effective value," the "effective risk score" of an abnormal event is defined as a product of actual risk score (of the abnormal event)*the associated relative change, which is proportional to actual risk score divided by its long-term moving average value.

Effective Number of Chattering Events:

In literature, when three or more alarm activations occur in 1 minute, the alarm system is said to be in chattering mode (classic definition). The associated alarms and events are referred as "chattering alarms" and "chattering events," respectively. Based on the concept of "effective value," the "effective number of chattering events" in a time period is defined as the product of actual number of chattering events (in the time period) and the associated relative change, which is proportional to actual value of chattering events divided by its long-term moving average value.

Figure 21:
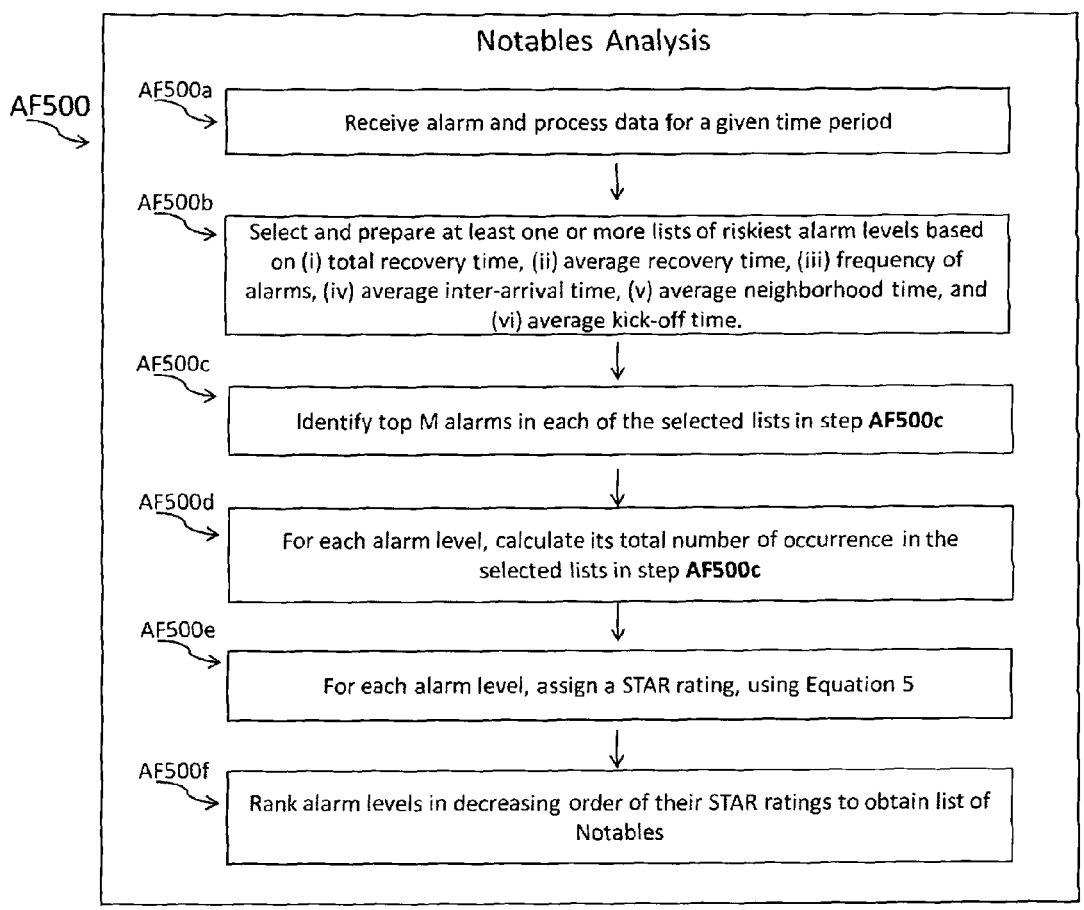
FIG. 21 schematically illustrates a method AF500 to identify "Notables" that is, alarms that appear in the high ranks in more than one list of alarms (ranked based on their different risk characteristics).

I.E. Notables Analysis:

"Notables" refer to noteworthy alarms, which appear in the higher ranks in more than one list of alarms (ranked based on their different risk characteristics). A method AF500 to identify the "Notables" is illustrated in FIG. 21. The list of "Notables" is prepared periodically (after every shift, day, week, month, quarter, etc.). Further, notables may be prepared for all alarms, as well as for selected smaller groups of alarms. For example, for identifying 'Notables,' one or more of the following lists are selected:

(a) List of top M alarms based on total recovery time;
(b) List of top M alarms based on average recovery time;
(c) List of top M alarms based on frequency of alarms;
(d) List of top M alarms based on average inter-arrival time;
(e) List of top M alarms based on average neighborhood time;
(f) List of top M alarms based on average kick-off time, wherein M varies between 5 to 20—with the typical value being 10.

Next, for each unique alarm (in the selected group of lists), the number of occurrences in different lists are counted. While coalescing the alarms from the different lists, each list is given a weighting factor, for example, 1:2:1:2:1:0, and the like. And finally, for each alarm, a STAR(*) rating is determined for each alarm as follows, in [Equation 5]:

$$\sum_{i=1}^{n} (\text{weighting factor for list } i) * \binom{\text{number of occurrences}}{\text{of that alarm in list } i}$$

Figures 22, 23:
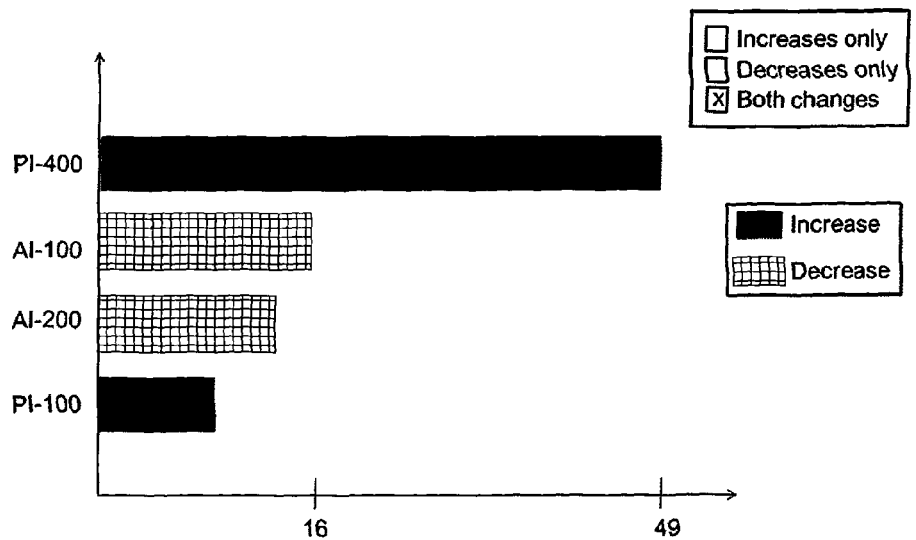
FIG. 22 presents a chart showing exemplary alarms with highest STAR ratings, whereby the Notable Alarms are arranged according to the STAR rating of each alarm.
FIG. 23 presents a bar graph showing an exemplary rank variation chart to compare and assess the changes in the ranks of alarms and/or variables.

The alarms with highest STAR ratings are identified as "Notables." The list of Notables is then arranged according to the STAR ratings of the alarms as shown in FIG. 22.

Dynamic Alarm Settings:

In method AF601 to dynamically set first and second levels of alarms for a variable, the first level of alarms (step AF601$a$), that is, H1 and L1 alarms, are set at +/−3 sigma limits, determined using its online measurement values, collected at select time interval (1-sec, 2-sec, 5-sec, etc.), based on the rate of change of the value of the variable for a relatively long period of time (with respect to its variation in time). Fast changing variables are preferably sampled more frequently. The "long period of time" means that the time ranges from 30 days to 365 days—typically 60 days. Thus, the 3-sigma limits for a variable, set at 99.865 and 0.135 percentile levels, indicate that 99.73% of the data points fall within the 3-sigma region, assuming normal distribution of data points, which is justified based on the Central Limit Theorem for large number of independent data points.

In addition, the second levels of alarms (step AF601$b$), that is, H2 and L2 alarms are placed at +/−4 sigma limits, which are set at 99.99685 and 0.00315, indicating that 99.9937% of the data points fall within the 4-sigma region. Because the 3-sigma and 4-sigma limits are updated periodically, the alarm levels are consequently also updated dynamically as well.

Long-Term Moving Averages (LTMA) for Time Segments:

Two types of long-term moving averages are defined for time segments: (a) long-term exponential moving average (LTEMA), and (b) long-term simple moving average (LTSMA). "Long-term exponential moving average" (LTEMA) for any of the time segments discussed above, refers to exponential-weighted moving average calculated using a given number of time segment values. The number of values is selected depending upon the variable, as well as on the alarm system. For example, recommended LTEMA calculations are made using the last 200 values, ranging up to at least 500 values or more. By comparison; for cases with less than 50 data points identified within 365 days, the recommended LTEMA calculations are made using the last 50 values, ranging down to a few as 25 values.

LTEMA applies more weight to recent values. The magnitude of weights applied to the most recent values depends on the number of values in the moving time period. For example, in the case of an alarm with a set of 50 recovery time values (which occurred in a period of 60 days), the LTEMA of the alarm's last 50 recovery times is calculated as follows:

Multiplier=(2/(Number of values+1))=
    (2/(50+1))=0.0392     [Equation 6]

LTEMA (50–value)={Current value−LTEMA(previous value)}*multiplier+LTEMA(previous value).     [Equation 7]

"Long-term simple moving average" (LTSMA) for a time segment refers to simple moving average of time segment values that occurred in a given long-term time period. Here, the long-term time period is selected anywhere between 30 to 365 days—typically 60 days. For cases with less than 5 data points in 60 days, the long-term time period is selected to ensure that at least 5 data points are included for calculations.

LTSMA applies equal weights to all the data pints. For example, consider the above case of alarm with 50 recovery time values in a period of 60 days. The LTSMA of its recovery times in last 60 days is calculated as follows:

$$LTSMA\ (60\text{-day}) = \frac{\sum_{i=1}^{i=50} i^{th}\ \text{recovery time}}{50} \qquad [\text{Equation 8}]$$

An additional concept is added of a "rare alarm," referring to an alarm that occurs very infrequently or rarely in a given time period. This definition requires two quantities to be specified: (a) the maximum number of alarms, $N_1$, and (b) the minimum time period, $T_1$. The value of $N_1$ is an integer between [0, 20] and $T_1$ ranges from 30 to 365 days. A typical qualification for a rare alarm is the occurrence of the given alarm ≤5 times in more than a 60 day time period.

Rank Variation Charts of Alarms and Variables:

A mechanism is provided to compare and assess the changes in the ranks of alarms and/or variables. The rank variations charts (and lists) provide an easy mechanism to quantify and compare the shifts in the ranks of alarms and/or variables. The variations also help identify the alarms and/or variables that experience the maximum change (increase or decrease), to the attention of plant/facility personnel.

To accomplish this rank variation mechanism, two alarm or variable lists are taken: (1) Current list and (2) Reference list. The "current list" is the list which the user wants to use to compare with the "reference list;" the "reference list" is the list which the user wants to compare against. To demonstrate the concept, if the reference list is list of 10 top alarms based on Average Recovery Time criteria for the most recent week, and if the comparison list is list of alarms based on Average Recovery Time criteria for 3 weeks ago, then the rank variation mechanism permits an assessment of how the ranks of top 10 alarms in the reference list change from the alarms as ranked in the comparison list. For example, if PI-400 (H1 alarm) is ranked at Rank #1 for the most recent week, whereas, 3 weeks ago the same alarm was Rank #50, then the comparison is shown as

| Item | Rank (Current list) | Rank (Reference List) | Change |
|---|---|---|---|
| PI-400, H1 alarm | 1 | 50 | 49↑ |
| LI-100, H2 alarm | 2 | 1 | 1↓ |

Reference List: Average Recorded Time, Aug. 1, 2011
Comparison List: Average Recorded Time, Jul. 1, 2011-Jul. 8, 2011

Figure 24:
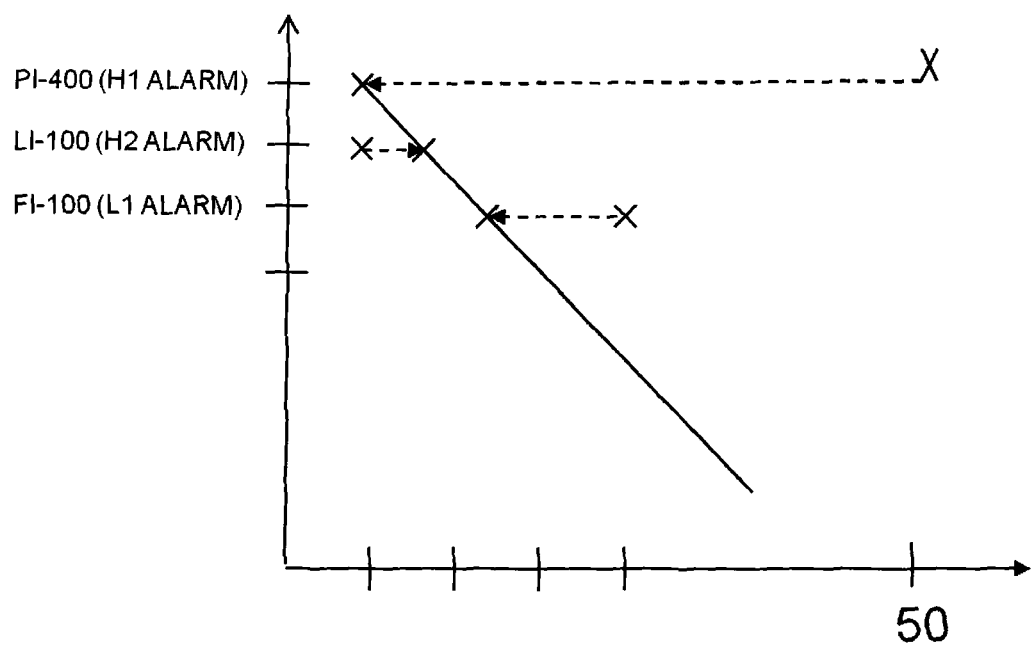
FIG. 24 presents a line graph showing the same data as FIG. 23, but in a different format to show "maximum change" in an exemplary rank variation chart to compare and assess the changes in the ranks of alarms and/or variables. X-axis shows absolute change, y-axis shows the variable/alarm.

The same information is presented as a chart in FIG. 23, and a chart showing "maximum change" is presented as FIG. 24, wherein x-axis shows the absolute change, y-axis shows the variable/alarm.

Risk Arrow:

An arrow with changing widths:  is used when a list of items is based on change(s) in the risk level. When the list is not arranged according to increasing/decreasing risk levels (e.g., when the items are arranged alphabetically or chronologically), the risk arrow does not appear. However, the utility of the risk arrow is that (a) it shows the direction of increasing (or decreasing) risk for a list of items, and (b) quick identification of high-risk items.

II. Dynamic Risk Analyzer

The Dynamic Risk Analyzer system (DRA) assesses operational risks in a plant/facility by characterizing its deviations from long-term behavior of the process. DRA increases the capacity of plant management team, such as plant managers, area supervisors, operators, and anyone else, such as insurance companies, who are interested in continuously assessing the risk level of operations as measured by deviations from the normal operating conditions, to better understand the important issues to be addressed for healthier operations, that is improved safety, operability, and reliability.

Figure 25:
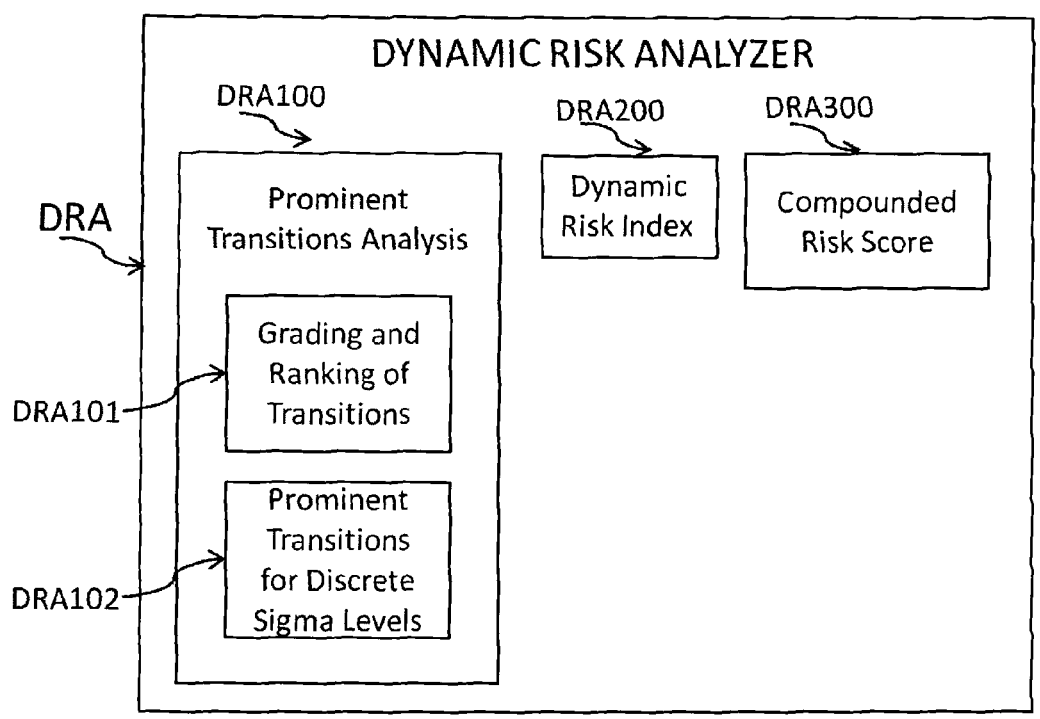
FIG. 25 schematically illustrates the Dynamic Risk Analyzer system (DRA) and its three components, denoted by 1) a Prominent Transitions Analysis (DRA100), including a subset Grading and Ranking of Transitions and Prominent Transitions for Discrete Sigma Levels; 2) a Dynamic Risk Index (DRA200); and 3) a Compounded Risk Score (DRA300).

FIG. 25 schematically illustrates the DRA system and its three components, denoted by 1) a Prominent Transitions Analysis (DRA100), including a subsets Grading and Ranking of Transitions, and Prominent Transitions for Discrete Sigma Levels; 2) a Dynamic a Dynamic Risk Index (DRA200); and 3) a Compounded Risk Score (DRA300).

The DRA calculations are based on analysis of historical alarm data and process data, conducted periodically (daily, weekly, monthly, etc.). "Process data" means data resulting from real-time measurements of both alarm and non-alarm based process variables associated with a plant/facility, including temperature, pressure, and the like, when real time assumes its normal meaning. More specifically, "process data" is the collection of all or at least some of the values of "process parameters" that are measured, and recorded/reported by the DCS (Distributed Control System, below) or any other device that automatically measures the value of one or more variables and reports the date either in-real time or periodically, or both. Process data include, for example, values including temperature measured in a reactor, at an inlet stream or an outlet stream, pressure of a reactor, flow rate of a liquid or gas going into or out of a reactor, liquid level in a reactor or a tank, and the like. In large industrial operations there are about 300 process variables that are measured and reported in the prior art. An industrial manufacturing operation centered around a reactor would have several parameters that are associated with that "reactor unit" (reactor and its associated peripheral equipment). Also there are several parameters associated with a liquid flowing into a reactor: its temperature, pressure, viscosity, etc. Together the values of all these parameters comprise "process data."

At least two types of alarms are defined in a plant/facility: 'H' alarms and 'L' alarms. For any variable, "H alarms" refer to those alarms which are set at thresholds, greater than the median value of the variable in a selected training data (typically 60-90 days). "L alarms" refer to those alarms which are set at thresholds, lesser than the median value of the variable in a selected training data. Often, H alarms include multiple levels of alarms indicated by 'H1 alarm,' 'H2 alarms,' and so on. Similarly, L alarms also include multiple levels of alarms indicated by 'L1 alarms,' 'L2 alarms,' and so on. The suffix number for H alarms and L alarms increase as the threshold values increase above or decrease below the median value, respectively. For example, for an H alarm, the threshold for an H2 alarm is greater than the threshold value for an H1 alarm, whereas the threshold for an H3 alarm is greater than the threshold value for an H2 alarm, and so on. Similarly, for L alarms, the threshold for an L2 alarm is less than the threshold value for an L1 alarm, whereas the threshold for an L3 alarm is less than the threshold value for an L2 alarm and so on. Moreover, often H1 alarms and L1 alarms are referred as first level alarms, H2 alarms and L2 alarms are referred as second level alarms, and so on. The thresholds at which each alarm is set is determined by plant/facility personnel during the commissioning of the plant/facility and are updated regularly (typically every 6 months to 1 year).

II.A. Prominent Transitions:

The concept of "prominent transitions" is introduced as defined as, identifying the riskiest transitions in the alarm activations, going from one level to the next for a given variable, wherein risk and riskiest were terms defined above in Subsection I. This new concept also enables one to analyze and compare the transitions between alarm levels of different variables, as well as for different time periods. These calculations are done periodically (such as after every shift, every day, every week, etc.), and the results are compared to identify the riskiest (or most prominent) transitions, as explained below. However, briefly, variables having more than one alarm level are measured and recorded, and the transitions from one alarm level to the next are analyzed and prioritized based on risk behavior.

Definition of Outer and Inner Levels of Alarms:

The terms 'Outer' and 'Inner' levels of alarms are introduced to refer to alarm levels in a relative manner. For example, when the first level of alarms is the reference level, the second, third, and subsequent levels of alarms are referred as "outer levels." By comparison, when the second level of alarms is the reference level, then the first level of alarms is referred as an "inner level," whereas, the third, fourth, and subsequent levels of alarms are referred to as "outer levels" relevant to the reference level. By example, if an alarm system has three layers of alarms—when the H1 alarm/L1 alarm is the reference level, then the H2 alarm/L2 alarm and the H3 alarm/L3 alarm are outer levels relevant to the reference level. If the 1-12 alarm/L2 alarm is the reference level, then the H3 alarm/L3 alarm is an "outer level," and the H1 alarm/L1 alarm is an "inner level." If the H3 alarm/L3 alarm is the reference level, then both the H1 alarm/L1 alarm and the H2 alarm/L2 alarm are inner levels.

Tiers of Transitions:

Different tiers of Transitions are defined as follows, wherein tier assumes its recognized meaning of a grade or level of transition:

Tier I transitions are those transitions that occur from first level of alarms (reference level) to second level of alarms (outer level). The transitions are shown as H1→H2, or L1→L2.

Tier II transitions are those transitions that occur from second level of alarms (reference level) to third level of alarms (outer level). The transitions are shown as H2→H3, or L2→L3.

Tier III and Tier IV transitions are similarly defined.

In addition, combo tiers are defined—e.g., Tier I-II transitions are those transitions that occur from first level of alarms (reference level) to third level of alarms (outer level), that is, from H1→H3 or L1→L3.

However, for the purposes of this invention, only transitions from a reference level to an outer level are considered; more specifically, transitions from a reference level to an inner level are not considered.

Figure 26:
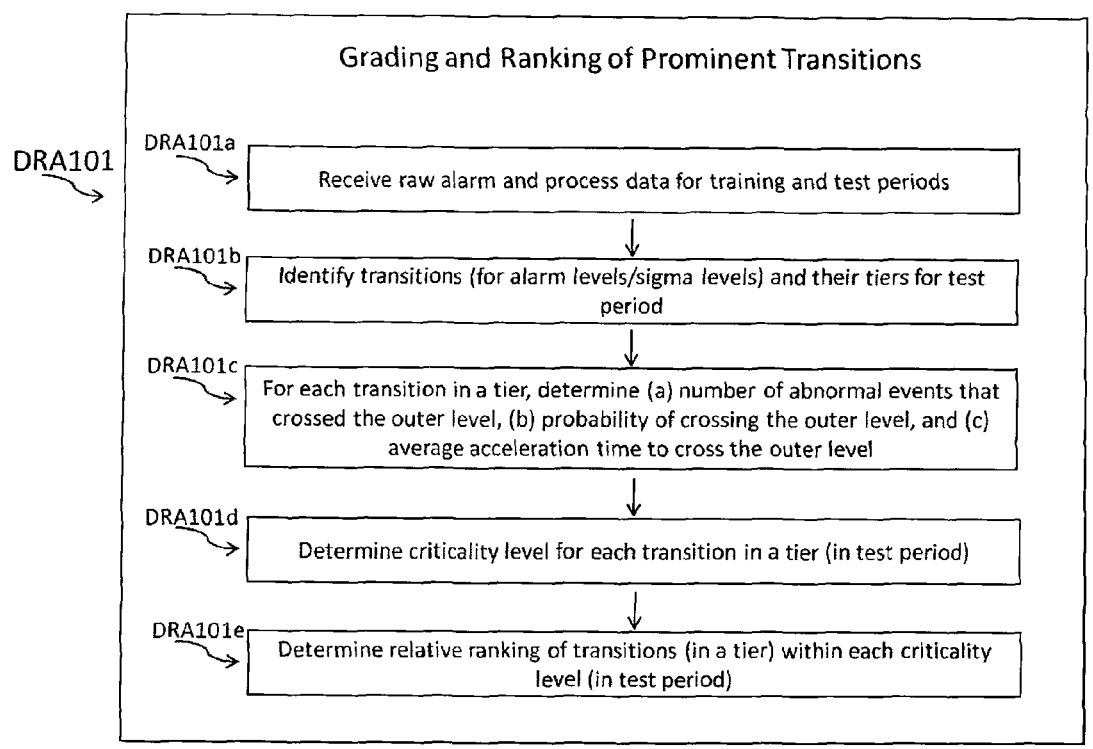
FIG. 26 schematically illustrates grading and ranking transitions in a given time period.

Grading of Transitions in a Given Time Period:

A method DRA101 is illustrated in FIG. 26 to grade and rank transitions in a given time period (e.g., days, weeks, months, custom time period), also referred as test period. First, a tier of transition and an appropriate training period for data (ranging from 1 month to 2 years) are selected. The calculations, as next described, are applicable to various different types of tiers of transitions.

Three criteria, used individually or in combination, are considered to grade the transitions in a "test period," which refers to a given time period being analyzed These include:

(a) Number of abnormal events crossing the outer level: For each transition, the number of abnormal events that crossed the outer level of alarms relevant to the reference level are considered. For example, for H1→H2 transition for a variable, all of its second stage abnormal events that cross the H2 alarms are counted. Previously discussed FIGS. 12 and 13 show two scenarios, respectively, each representing an abnormal event; and (b) Probability of crossing the outer level: To calculate the probability of crossing the outer level (with respect to reference level), three additional types of calculations are introduced—frequency-based, duration-based, and area-based, which are presented in greater detail below.

(c) Average acceleration time to cross the outer level (with respect to reference level): The values of all the acceleration times (associated with the abnormal events) in a given time period are recorded and their average is calculated. In some cases, the median values are considered instead of the average values.

Thus, for a transition, H1→H2, the acceleration times associated with all of the 2nd stage abnormal events that cross the H2 alarms are taken, and their average value is calculated in this criterion.

Frequency-Based Calculations:

Frequency-based calculations use the data on the number of abnormal events that cross the outer level and the reference level. Classical statistics and Bayesian statistics are used to calculate the mean probabilities of crossing the outer level with respect to reference level, written as follows: "Let the number of abnormal events that cross the reference level and the outer level be denoted as $N_1$ and $N_2$." Thus, using classical statistics, probability of crossing the outer level=$N_2/N_1$.

In Bayesian statistics, any abnormal event that crosses the reference level has one of two possible outcomes: 1) success, when it returns within the reference level, without crossing the outer level; and 2) failure, when it crosses the outer level. Thus, the outcome is modeled as independent and identical Bernoulli trials with probability of crossing the outer level as θ. The prior distribution for θ is assumed to be Beta distribution (conjugate prior) with the shape vector [$a_1$, $b_1$]. Terms $a_1$ and $b_1$ are calculated based on long-term averages of abnormal events that crossed the outer level and reference level in "training data." For a given time period, wherein the success and failure counts are equal to ($N_1-N_2$) and $N_2$, the mean posterior value of probability of crossing the outer level is calculated as:

$$\frac{N_2 + a_1}{N_1 + a_1 + b_1} \qquad \text{[Equation 9]}$$

Determining Priors Based on Long-Term Averages:

The above parameters [$a_1$, $b_1$] denote shape vectors for prior belief distribution. Herein, a new concept of choosing their values based on long-term averages is introduced. It is claimed that for a given variable or a group of variables, the value of $a_1$ is chosen as $\alpha\overline{N_2}$, where $\overline{N_2}$ denotes long-term average value of abnormal events that cross the outer level, calculated using a training set of data and α denotes a proportionality constant in (0,2]. Similarly, the value of $b_1$ is chosen as $\beta\overline{N_1-N_2}$, where $\beta\overline{N_1-N_2}$ denotes long-term average value of abnormal events that cross the reference level only, calculated using a training set of data and β denotes a proportionality constant in (0,2]. Again, the training set of data ranges between last 30 to 365 days (typically 60 days) and is updated periodically.

Figure 27:
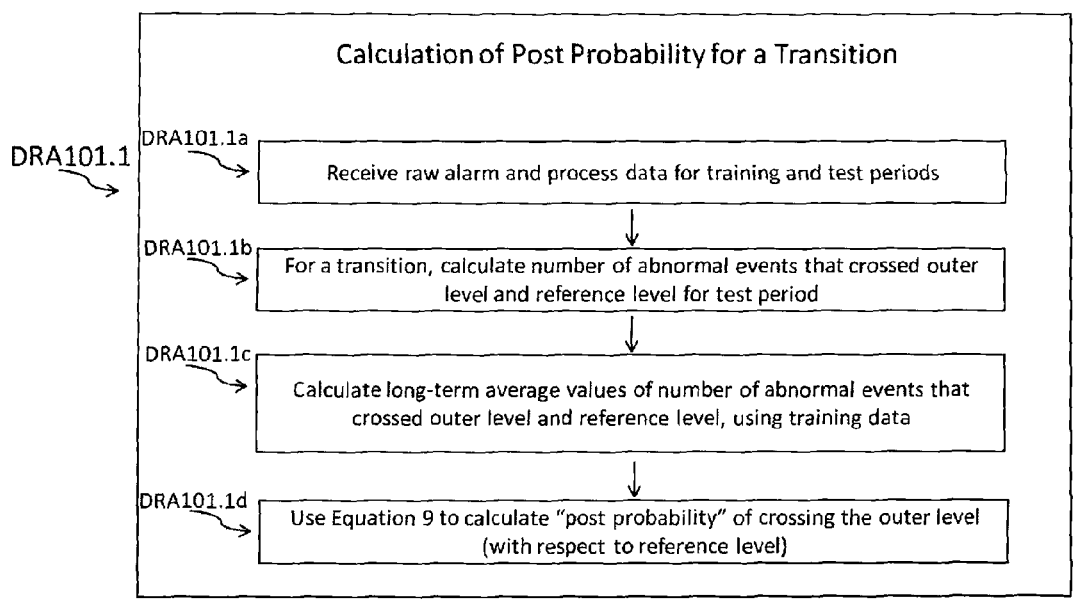
FIG. 27 schematically illustrates a method for calculating a post probability value for a transition, the value being obtained using Bayesian statistics, with priors based on long-term averages.

The values of α and β depend upon how much weight one wants to give to the prior belief in the posterior value. A recommended value for both α and β is 0.5 that denotes half as much emphasis on the prior belief as compared to the actual likelihood data (data for the time period in consideration). In summary, this probability value, obtained using Bayesian statistics, with priors based on long-term averages, is referred as "post probability value." A method for its calculation is illustrated in FIG. 27. As pointed out above, these probability calculations are done for a single variable as well as for groups of variables.

Consider a case when $N_2$=0 for a time period. According to Classical Statistics, the probability of crossing the outer level=0. But that probability does not mean that the associated risk (of crossing the outer level) in that week is 0, or that the risk going forward is 0. In fact, according to Bayesian statistics, the posterior probability is non-zero, and is determined by a combination of prior belief and actual data in that week. Thus, the utility of determining priors based on long-term averages is that the determination incorporates long-term behavior (indicating 'inherent risk') in the posterior estimate, which indicates an updated value of 'inherent risk.' This allows plant/facility management to better track the changes in the risk profile, which may happen due to gradual changes in the alarm system, or forced changes in the operations; hence, enabling the plant/facility operators to take actions to prevent future problems.

Duration-Based Calculations:

Duration-based calculations use the data on the times spent by the variable beyond the outer level, as well as the reference level of alarms in a given time period. Thus, using classical statistics, probability of crossing the outer level is defined in three ways:

(Total time spent by variable beyond the outer level)/
(Total time spent by variable beyond the reference level)     [Equation 10]

(Average time spent by variable beyond the outer level)/(average time spent by variable beyond the reference level)     [Equation 11]

Average of [(time spent by a variable beyond the outer level)/(time spent by variable beyond the reference level)]     [Equation 12]

In Bayesian statistics, the times spent by variable beyond any level are modeled using either of the three different distributions: (a) exponential distribution, (b) Weibull distribution, and (c) log-normal distribution. With an appropriate prior distribution (e.g., gamma distribution, which is conjugate distribution for exponential as well as lognormal distribution, or a uniform distribution, etc.), posterior estimates for times spent by variable beyond any level are calculated using Bayesian theory.

Area-Based Calculations:

Area-based calculations use the data on the total area traced by the variable beyond the outer level as well as the reference level of alarms in a given time period. Thus, using classical statistics, probability of crossing the outer level is defined in three ways:

(Total area traced by variable beyond the outer level)/
(Total area traced by variable beyond the reference level)     [Equation 13]

(Average area traced by variable beyond the outer level)/(average area traced by variable beyond the reference level)     [Equation 14]

Average of [(area traced by a variable beyond the outer level)/(area traced by variable beyond the reference level)]     [Equation 15]

In Bayesian statistics, the areas traced by variable beyond any level are modeled using either of three different distributions: (a) exponential distribution, (b) Weibull distribution, and (c) log-normal distribution. With an appropriate prior distribution (e.g. gamma distribution, which is conjugate distribution for exponential as well as lognormal distribution, or a uniform distribution, etc.), posterior estimates for areas traced by variable beyond any level are calculated using Bayesian theory.

Determination of Criticality Levels for Transitions on an Absolute Scale:

Using the categories '$\Delta_3$', '$\Delta_2$', and '$\Delta_1$', the three criticality levels are defined to characterize the transitions on an absolute scale. The corresponding calculations are similar to that of the Alarm Floods and Alarm Attacks section above.

To calculate the Criticality Levels, first, a training period is selected and transitions in that period are identified. The recommended range for a training period is 1 month to 2 years, typically 6 months. Next, for each transition (in test period), the three criteria defined above are calculated. Then, for each of the three criteria, different percentile levels (e.g., 25th, 50th, 60th, 70th, 75th, 90th, etc.) are determined from the values for all of the transitions during the training period. Thus, the method for determining a criticality level for a transition (in test period) is described in the following steps:

Classify a transition as $\Delta_3$, if the value of each criterion associated with that transition is above $P_1$th percentile of the values for that criterion calculated using the training period (as explained above). Here, the value of $P_1$ ranges between [50, 100)—typical value is 75.

Classify a transition as $\Delta_2$, if the value of any criterion associated with that transition is above $P_2$th percentile of the values for that criterion calculated using the training period. Here, the value of $P_2$ ranges between [$P_1$+10, 100)—typical value is 90.

Classify the remaining transitions as $\Delta_1$ transitions.

Relative Ranking of Transitions within a Given Criticality Level:

The following describes the steps to determine the relative ranks of transitions within a given criticality level ('$\Delta_3$', '$\Delta_2$', or '$\Delta_1$'). First, list all the transitions for a given criticality level. Then, prepare a list of transitions in a decreasing order for each of the three criteria to produce the transitions in decreasing order of their values, as determined per criterion calculations described above. Next assign ranks to the transitions in each list, ranking the top one as #1, as shown in calculations above. The finally, to determine the relative ranking of transitions within a given criticality category, a) obtain the final rank of each transition by adding the three individual ranks, and b) organize the final list in ascending order.

Prominent Transitions for Discrete Sigma Levels (DRA102):

For any variable, a "discrete standard deviation level," also known as "discrete sigma level," refers to a threshold value that is a function of its mean and standard deviation value. The threshold value is calculated using "process data" per "training period." Note that "training period" typically includes several months of "training data" which is typically, sampled every 5-sec, 10-sec, etc.; and which is based on the rate of change of value of the variable (with more rapidly than normal changing variables are sampled more frequently). "Discrete standard deviation level" is often referred as "n standard deviation level" or "n sigma level," where 'n' is a real number, used to represent the level. For a particular value of 'n', two types of "n standard deviation level" are reported: '+' value and '−' value. The '+' value of an 'n-standard deviation level' is denoted as "+n standard deviation level" or "+n sigma level;" and the value of 'n-standard deviation level', denoted as "−n standard deviation level" or "−n sigma level."

There are two ways of calculating the "+n standard deviation level" and "−n standard deviation level." In method (1), typically 'n' is chosen in the range [2, 6]. Clearly, as value of n increases, the associated sigma levels move away from the mean value. The calculations are as follows:

+n standard deviation level'=mean value of variable calculated using "training data"+product of 'n' and standard deviation value of variable calculated using training data     [Equation 16]

−n standard deviation level'=mean value of variable calculated using training data minus product of 'n' and standard deviation value of variable calculated using training data.     [Equation 17]

In method 2, a large number, e.g., a million or more, of random samples are simulated from a Gaussian distribution with mean equal to 1, and standard deviation equal to 0. Then for a particular 'n', the '+n sigma level' and the '−n sigma level' are calculated for the Gaussian distribution using the steps of Method 1. Note that often "discrete sigma levels" are referred as simply "sigma levels." Next, the percentage of data points that lie within the '+n sigma level' and the '−n sigma level' is calculated and denoted as 'r.' Then, the value of the '+n sigma level' for the "training data" is equal to 'p'th percentile value for "training data," where p=(r+(0.5×(100−r))). Similarly, the value of the n sigma level' for the "training data" is equal to 'q'th percentile value for "training data," where q=(0.5×(100−r)).

Method DRA101 is applicable for transitions from (a) an alarm level to another (calculated using alarm data), and (b) a "discrete sigma level" to another. The following tiers of transitions for sigma levels (all sigma levels mentioned below apply to both "+" and "−" sigma values) as defined:

Tier I transitions for sigma levels are those transitions that occur from 3-sigma level (reference level) to 3.25-sigma level (outer level).

Tier II transitions for sigma levels are those transitions that occur from 3.25-sigma level (reference level) to 3.5-sigma level of alarms (outer level).

Tier III transitions for sigma levels are those transitions that occur from 3.5-sigma level (reference level) to 3.75-sigma level of alarms (outer level).

Tier IV transitions for sigma levels are those transitions that occur from 3.75-sigma level (reference level) to 4-sigma level of alarms (outer level).

Higher tiers of transitions for sigma levels are defined similarly, having a gap of 0.25 sigma level.

Combo tiers for sigma levels are defined, e.g., Tier I-II transitions for sigma levels as those transitions that occur from 3-sigma level (reference level) to 3.5-sigma level (outer level).

Other types of tiers of transitions can also be defined when variable moves from a discrete sigma level to another. Thus, all steps of method DRA101 remain unchanged for sigma levels. Note that other tiers of transitions can be defined for various discrete sigma levels in a similar way.

II.B. Dynamic Risk Index

Figure 28:
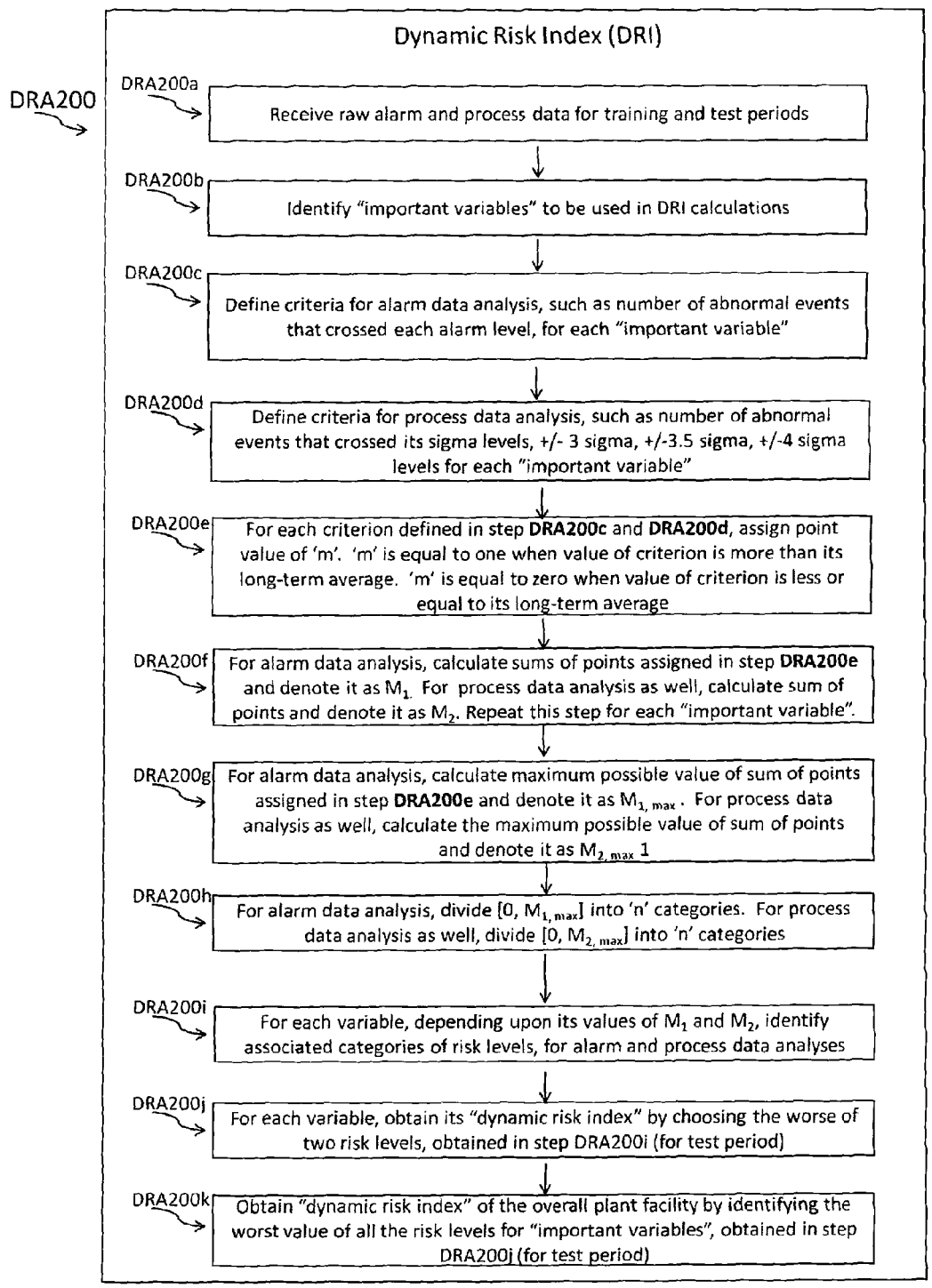
FIG. 28 schematically illustrates a method DRA200 to calculate "Dynamic Risk Index (DRI)" of a plant/facility.

A method DRA200 to calculate "Dynamic Risk Index (DRI)" of a plant/facility is illustrated in FIG. 28. "DRI" identifies risk levels of a plant/facility dynamically and provides information to operators, engineers, maintenance, and management on deviations of process from its long-term behavior.

First, a set of important variables, such as key performance indicators or variables that are associated with input to the process (such as flow rate of a reactant or coolant) is selected and their individual DRIs are calculated. These individual DRIs are used to obtain the DRI for the overall plant. The "important variables" are variables, which are considered to be significant for gauging safety, operability, and for determining risk levels. Note that the "important variables" may or may not be equipped with alarms, but are identified by the plant/facility personnel as being significant ("important").

For each variable, the following steps are performed to determine its DRI for a select time period (such as daily, weekly, biweekly, monthly, and quarterly), referred as test period:

Step 1) Two types of analyses are considered: (i) alarm data analysis, and (ii) process data analysis. As discussed later, when the two analyses differ in their risk level estimates—say, one estimate is "RL3" and other is "RL1" (defined later)—then, the two estimates are combined to obtain the final risk level as the actual risk level associated with that variable. Note that for the variables that do not have alarms, only the process data analysis is performed. Moreover, under alarm data analysis, depending upon the number of alarm levels associated with the variable, the following criteria are considered:

Criteria #1: Number of abnormal events that crossed first level of alarm.

Criteria #2: Number of abnormal events that crossed second level of alarm, and so on.

Next, a specific example (with more than one—in this case two alarm levels) is presented to show the possible criteria. Consider a variable with the following alarm levels: H1/L1 and H2/L2. In this case, the following criteria are considered for alarm data analysis:

(a) Criteria #1: Number of abnormal events that crossed 'H1' alarm level.

(b) Criteria #2: Number of abnormal events that crossed 'H2' alarm level.

(c) Criteria #3: Number of abnormal events that crossed 'L1' alarm level.

(d) Criteria #4: Number of abnormal events that crossed 'L2' alarm level.

Under the process data analysis, the criteria are based on the number of abnormal events that crossed multiple "discrete sigma levels." For example, the following criteria can be chosen:

Criteria #1: Number of abnormal events that crossed 3 sigma level.

Criteria #2: Number of abnormal events that crossed 3.5 sigma level.

Criteria #3: Number of abnormal events that crossed 4 sigma level.

Criteria #4: Number of abnormal events that crossed −3 sigma level.

Criteria #5: Number of abnormal events that crossed −3.5 sigma level.

Criteria #6: Number of abnormal events that crossed −4 sigma level.

Step 2) Next, for both type of analyses (alarm data analysis and process data analysis), the following calculations are performed:

(a) For each criterion, a point value of 'm' is assigned. Typically m ranges from [1, 5]. 'm' is equal to one (1), when the value of criterion is more than its long-term average (this scenario indicates an increase in risk level with respect to long-term average). 'm' is equal to zero, when the value of criterion is less than or equal to its long-term average.

(b) For alarm data analysis, the sum of points (for all associated criteria) is obtained, and is denoted $M_1$, and for process data analysis, the sum of points (for all associated criteria) is obtained and is denoted by $M_2$. In addition, for alarm data analysis, the maximum possible value of $M_1$, denoted by $M_{1,max}$, is obtained by assuming each associated criterion to be more than its long-term average and summing all the points. Similarly, for process data analysis, the maximum possible value of $M_2$, denoted by $M_{2,max}$ is obtained by assuming each associated criterion to be more than its long-term average and summing all the points.

(c) For alarm data analysis, divide, zero to $M_{1,max}$, into 'n' categories and for process data analysis, divide zero to $M_{2,max}$, into 'n' categories. Each category refers to a risk level, and referred as RL1, RL2, . . . , RLn. Typically, 'n' is 3 and the three risk levels are referred as RL1, RL2, and RL3. Clearly, RL3 indicates a riskier level than RL2, and RL2 indicates a riskier level than RL1. Next, for alarm data analysis, depending upon value of $M_1$, a risk level is identified and for process data analysis, depending upon of $M_2$, a risk level is identified. A fourth category of risk level "Shutdown," can also be added and assigned when the variable leads to a shutdown.

Thus, for each variable, two values of risk levels are obtained—one from alarm data analysis and other from process data analysis. Then, the two risk levels are combined or averaged to obtain value of a single "dynamic risk index" for the variable. Multiple indices may be calculated. Unless the two are the same, typically the worse of the two risk levels is chosen as the final dynamic risk level for the variable. As mentioned above, the steps (a) to (c) are carried out for each of the important variables, generating several DRI values.

(d) Next, all DRIs calculated for the important variables, are pooled and combined or averaged to obtain the DRI for the overall unit. Typically the worst risk level is chosen as the final DRI for overall plant/facility. In case of a production unit shutdown in a given time period, the DRI is reported as "Shutdown."

Figure 29:
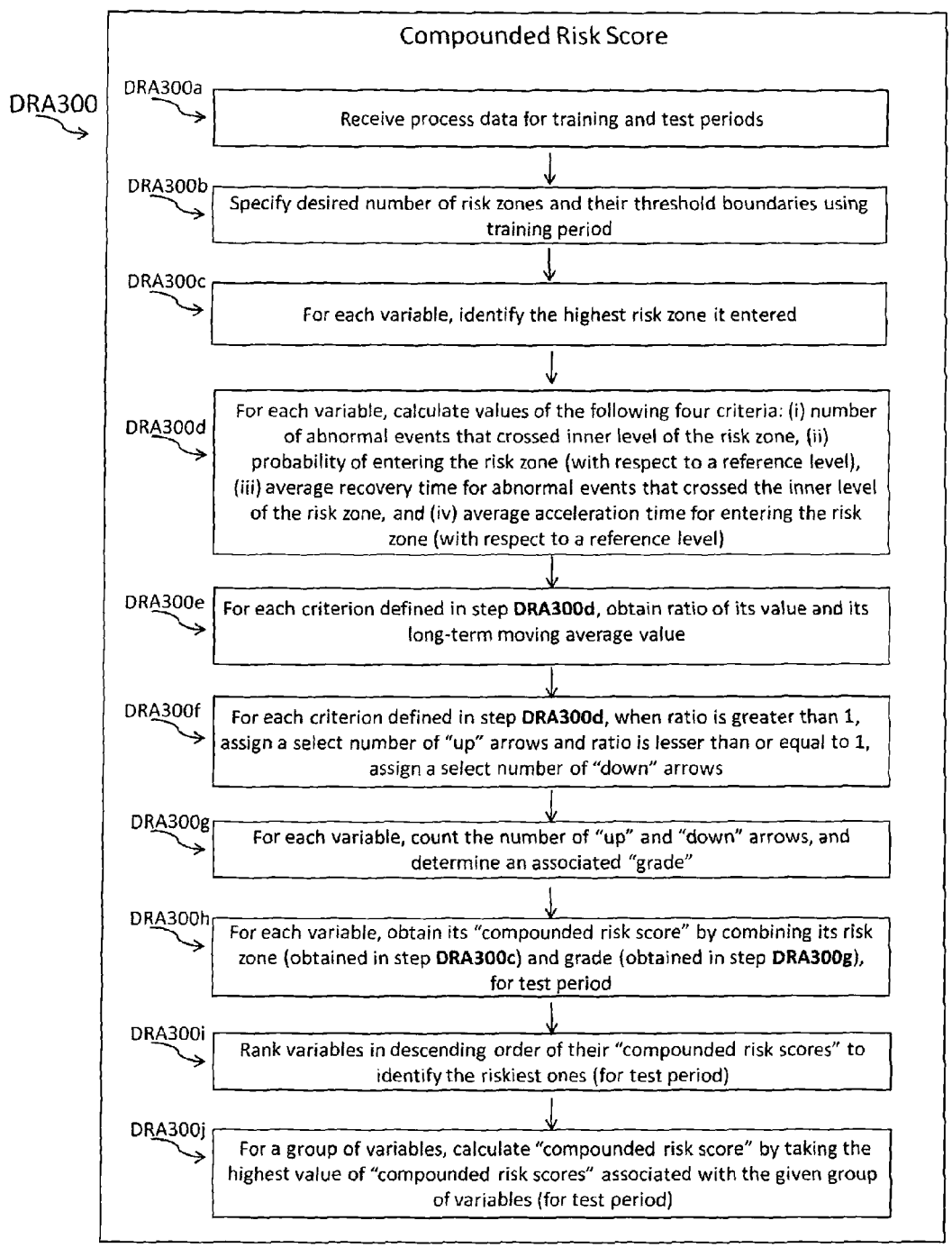
FIG. 29 schematically illustrates a method DRA300 to calculate "compounded risk score."

II.C. Compounded Risk Score (CRS):

"Compounded Risk Score" is one of the leading risk indicators (LRIs) of DRPS that calculates risk associated with a variable, group of variables, unit, interlock, or overall plant/facility over a period of time. It provides a mechanism to quantify the risk profiles based on their associated online measurement data. A method DRA300 to calculate "compounded risk score" is illustrated in FIG. 29.

Definition of "Risk Zones" and Discrete Grades within a Risk Zone:

For any variable, based on "discrete standard deviation levels," multiple "risk zones" are defined. For example, considering 3-sigma and 4-sigma levels as boundaries of a "risk zone," 3 different risk zones are defined. Similarly, considering 2-sigma, 2.5 sigma, 3-sigma, 3.5 sigma, 4-sigma, 4.5 sigma, 5-sigma, 5.5 sigma, and 6-sigma levels as boundaries of different risk zones, 10 different risk zones are defined.

For any variable, based on these high discrete standard deviation levels, multiple risk zones are defined. For example, considering 3-sigma and 4-sigma levels as boundaries of risk zones, 3 different risk zones are defined. Similarly, considering 2-sigma, 2.5 sigma, 3-sigma, 3.5 sigma, 4-sigma, 4.5 sigma, 5-sigma, 5.5 sigma, and 6-sigma as boundaries of risk zones, 10 different risk zones are defined.

Herein, a specific example is taken in which three risk zones are defined and referred as: "Z1," "Z2," and "Z3," with 3-sigma and 4-sigma as the separating boundaries respectively. In other words, whenever a variable moves beyond its 3-sigma level (but remains within its 4-sigma level), it enters into its "Z2" zone; when a variable moves beyond its 4-sigma level, then the variable enters the "Z3" zone. For "Z2" and "Z3" zones, several intermediate grades are defined. To assign an appropriate grade within any risk zone, the following four criteria are defined:

1. Number of abnormal events crossing the associated sigma level.
2. Probability of crossing the associated sigma level.
3. Total recovery time for the associated sigma level.
4. Average acceleration time for the associated sigma level.

For example, for "Z2" zone, the four criteria are: (1) number of abnormal events crossing 3-sigma level, (2) probability of crossing 3-sigma level, (3) average recovery time for 3-sigma level, and (4) average acceleration time for 3-sigma level (from 2-sigma level).

A select time period is chosen (referred as "test period") and values of above criteria are calculated. When value of any criteria is higher than its long-term moving average, a select number of up arrows (↑) are assigned—indicating an increase in risk level with respect to its normal operations/behavior. Similarly, when the value is lower than its long-term average value, a select number of down arrows (↓) are assigned—indicating a decrease in risk level with respect to its normal operations/behavior. The following rules are used to determine the number of arrows to be assigned in a given case:

(a) For a given criterion, when the magnitude of deviation with respect to normal operations is very high, such as 50% increase or decrease, multiple arrows (e.g., two or three) are used.

(b) If a given criterion is considered more important than the others, multiple arrows are used for the former to put more weight on deviations thereof.

In a specific example, the assignment of the arrows is shown, wherein a single up or single down arrow is assigned to indicate increase or decrease in risk level with respect to normal operations. Consequently, for this example, 5 grades are obtained for each risk zone:

↑↑↑↑: Grade 5: Values of all four criteria are higher than their LTMAs.

↑↑↑↓: Grade 4: Values of three criteria are higher and one is lower than the LTMAs.

↑↑↓↓: Grade 3: Values of two criteria are higher and two are lower than the LTMAs.

↑↓↓↓: Grade 2: Value of one criterion is higher and three are lower than the LTMAs.

↓↓↓↓: Grade 1: Values of all four criteria are lower than their LTMAs.

Compounded Risk Score for a Variable:

The Compounded Risk Score for any variable is obtained by identifying (a) the maximum risk zone it entered and (b) an associated grade because of that entry. The different possible CRSs in descending order are as follows:

| Compounded Risk Score | Criteria |
| --- | --- |
| Shutdown | Variable crossed ESD level, followed by a shutdown |
| Z3 (Grade 5) or (Z3)$^5$ | Variable crossed 4-sigma and ↑↑↑↑ |
| Z3 (Grade 4) or (Z3)$^4$ | Variable crossed 4-sigma and ↑↑↑↓ |
| Z3 (Grade 3) or (Z3)$^3$ | Variable crossed 4-sigma and ↑↑↓↓ |
| Z3 (Grade 2) or (Z3)$^2$ | Variable crossed 4-sigma and ↑↓↓↓ |
| Z3 (Grade 1) or (Z3)$^1$ | Variable crossed 4-sigma and ↓↓↓↓ |
| Z2 (Grade 5) or (Z2)$^5$ | Variable crossed 3-sigma and ↑↑↑↑ |
| Z2 (Grade 4) or (Z2)$^4$ | Variable crossed 3-sigma and ↑↑↑↓ |
| Z2 (Grade 3) or (Z2)$^3$ | Variable crossed 3-sigma and ↑↑↓↓ |
| Z2 (Grade 2) or (Z2)$^2$ | Variable crossed 3-sigma and ↑↓↓↓ |
| Z2 (Grade 1) or (Z2)$^1$ | Variable crossed 3-sigma and ↓↓↓↓ |

Note that superscripts following "Z2" in the Compounded Risk Score column refer to Grade of Risk within the Z2 zone.

Figure 30:
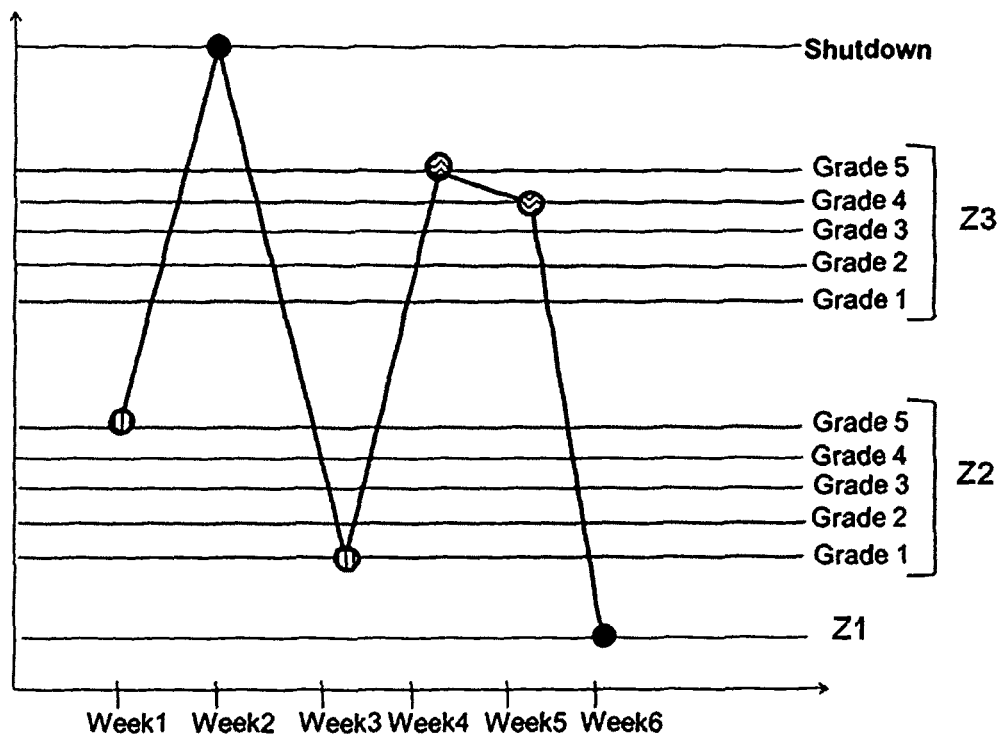
FIG. 30 diagrammatically provides a line graph showing an exemplary Compounded Risk Score for Variable A over a period of 6 weeks.
Figure 31:
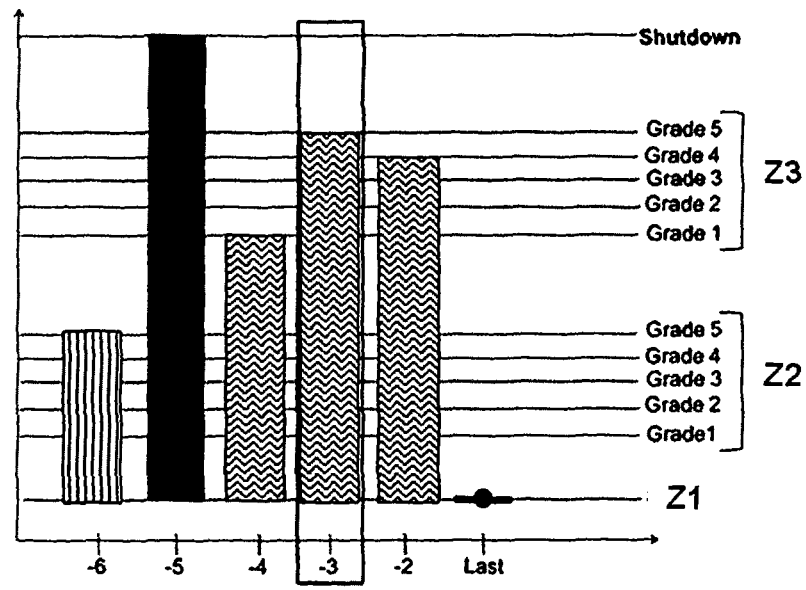
FIG. 31 graphically provides a bar graph reiterating the data shown in FIG. 30.

Organization of Variables Based on their Compounded Risk Score:

By organizing the variables according to their Compounded Risk Score, identification of those variables is enabled that deviate most from their normal operations. The Compounded Risk Score for a group of variables is calculated by taking the highest value of compounded risk scores associated with the given group of variables. In both the diagram provided as FIG. 30 and the bar graph in FIG. 31, an exemplary Compounded Risk Score is provided for Variable A over a period of 6 weeks. As seen the bar at three weeks prior to the current week (designated "last week"), the compounded risk score was Z3 (Grade 5). At 5 weeks prior to the same current week, there was a shutdown, which overrode other risk factors in that week—hence, the compounded risk score is indicated as 'Shutdown,' shown as a black bar. Thus, "compounded risk score" calculations are applicable for a variable, group of variables, unit, interlock, or overall plant/facility over a period of time.

III. Real-Time Leading Signal Generator

Figure 32:
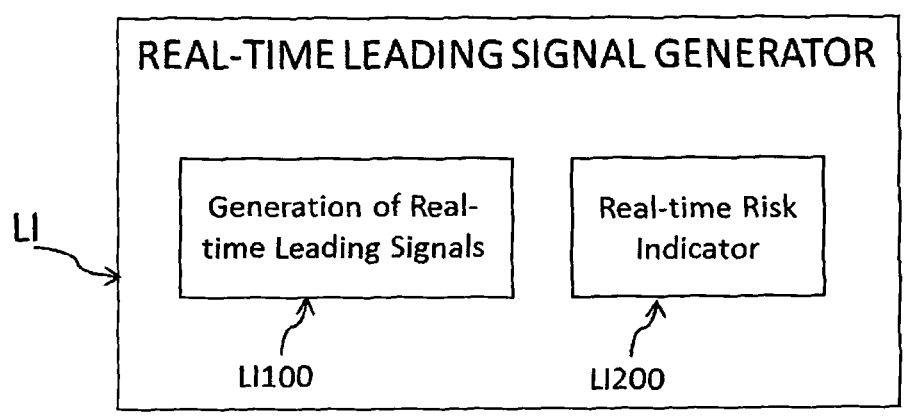
FIG. 32 schematically illustrates the Real-time Leading Signal Generator system (LI).

The Real-time Leading Signal Generator system LI (illustrated in FIG. 32) informs operators of a plant/facility of the potential of incidents or catastrophe in real-time by issuing warning signals based on process data, obtained in real-time. In addition, the system reports real-time risk status to the plant/facility personnel to depict the health of the operation in real time. The methods presented in Real-Time Leading Signal Generator system increase the capacity of operators to prevent accidents, quality deviations, and unexpected shutdowns, by identifying significant risks as extent of deviations of process variables from normal operating conditions, within a time frame that enables an advanced corrective action to be taken in a timely manner (in most cases).

"Real-time" as used herein does not refers to the actual time during which a process or event occurs, nor does it relate to a system in which input data is processed within milliseconds, so that it is available virtually immediately as feedback, e.g., in a computerized system; rather in the present context the term refers to calculations that are made and the results are used in a just-in-time manner. In other words the real-time process for the leading signal generator calculates long-term trends over predetermined time periods, but wherein during that time, for every second (or 5 seconds or more in a preset period), when the data is measured, the collected data associated with the variable is compared against the long-term or historical data to determine if the newly collected data significantly deviates (percent deviation) from the long-term data, or not. If it is deviated more than a predetermined value as explained in the method a leading signal alert is automatically issued as a message or symbol with associated information indicating the variable that has deviated, as described in the flag process below.

The LI system includes the following two methods: 1) Generation of Real-time Leading Signals (LI100); and 2) Real-time Risk Indicator (LI200). A "leading signal" is an alert in the form of a text, symbol, or combination thereof, which indicates that the particular variable with which it is associated, has deviated from normal or long-term plant/facility operations more than the predetermined percent deviation that the plant/facility has previously established as acceptable to their business. As a result, the existence of a leading signal with regard to an operation indicates that there is a potential risk of an adverse incident, accident or unplanned shutdown. "Normal" as used herein therefore, is predetermined by the plant/facility as an acceptable or historically acceptable level of operation or of a variable in the operation, in contrast to an abnormal situation in which the leading signal is applied and risk potential is changed or elevated above normal, or above predetermined critical levels.

Definition of Pre-Flag Limits:

For a variable, "pre-flag limits" refer to boundaries that enclose X percent of data points in "training data." X ranges from [75, 100)—typically value being 98. "Training data" includes several months of data, sampled every 5-sec, 10-sec, etc., and based on the rate of change of value of the variable (more rapidly than normal, changing variables are sampled more frequently). Typically, training data includes 1 month of data, with data points available at every 5-sec or 1-sec. In the case in which the variable is sampled at a frequency higher than 5-sec or 1-sec, interpolation is done to obtain values at those time instants. Two types of "pre-flag limits" are defined: "+pre-flag limit" and "−pre-flag limit." Typically, the "+pre-flag limit" is set at 99th percentile value and "−pre-flag limit" at 1st percentile value, calculated using the training data. The utility of pre-flag limits is that the region that they enclose depicts normal operating conditions.

Figure 33:
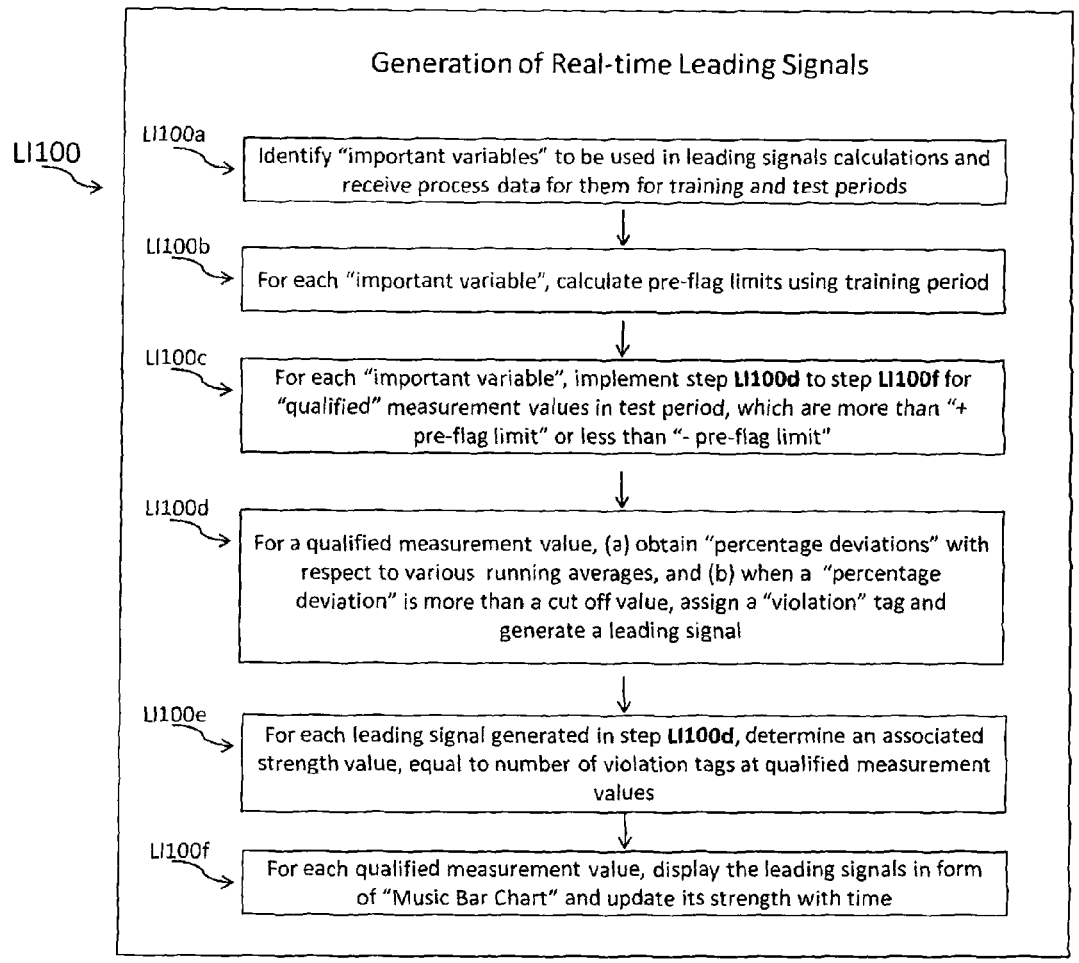
FIG. 33 schematically illustrates a method to generate "Real-time Leading Signals."

Generation of Real-Time Leading Signals:

A method LI100 to generate "Real-time Leading Signals" is illustrated in FIG. 33. These "leading signals" forewarn the operators and personnel at the plant/facility of potential of incidents (including shutdowns). The leading signals are typically calculated for select important variables—which are either specified by plant/facility personnel or depict critical process parameters. The idea is to monitor the trajectory of a variable and determine the deviations from different running averages at select time intervals to identify risky situations and issue leading signals accordingly. The following provides a summary of methodology of calculation of leading signals for a given variable.

Calculations of Leading Signals:

First identify training data, and calculate the "pre-flag limits" using the training data. Next, identify a test period and at a select "frequency," obtain measurement value. Frequency refers to a time interval (such as 5-sec, 10-sec, etc.) at which a variable measurement value is obtained. At each time instant when a measurement value is obtained, identify whether the value is "qualified" or not by verifying whether it is more than "+pre-flag limit" or less than "−pre-flag limit." For each qualified measurement value, calculate (a) running average values over select period of time (including the current value), such as 2-hour, 12-hour, etc. and (b) "percentage deviations" of the current measured value from these averages. A percentage deviation is defined as follows:

$$\% \text{ deviation} = 100 * ((\text{Measurement value} - \text{running average value})/(\text{running average value})). \quad [\text{Equation 18}]$$

Notably, the percentage deviations must be calculated for at least two different running averages, e.g., for 2-hour and 12-hour. Whenever any of the percentage deviation values is more than a cutoff value (e.g., 25%), a "violation" tag is assigned and a leading signal is issued. At any instant, the total number of "violation" tags determines the strength of the leading signal. The higher the strength, the more powerful is the leading signal. Moreover, cutoff values can be selected differently for different running averages.

Figure 34:
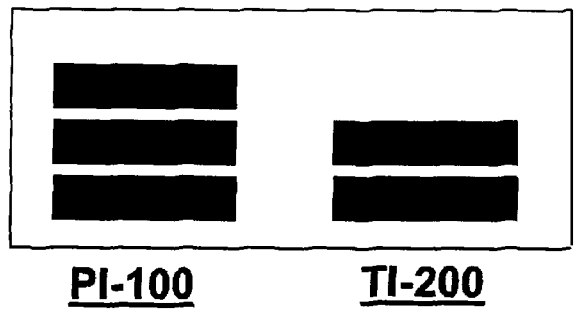
FIG. 34 graphically depicts a Music Bar Chart, wherein the bars associated with the variables, such as exemplary variables PI-100 and TI-200. The bars are displayed as a stack.

Music Bar Chart:

A novel concept of "Music Bar Chart" is defined to display the number of violations (defined above) associated with select variables. For a given variable, a "bar" is assigned for each violation. For example, in a Music Bar Chart as shown in FIG. 34, all the bars, associated with the variables, are displayed as a stack. PI-100 and TI-200 are exemplary variables. At any time instant, Music Bar Chart shows the number of violations tags associated with select important variables. For a given variable, a bar represents each violation tag. Because the number of violation tags changes with every time instant, the number of bars in the Music Bar Chart changes with time as well, giving an impression of a traditional Music chart. Thus the chart is an intuitive way of visualizing how violation tags (the bars) change with time, overall creating, that gives an impression of a media music chart.

Figure 35:
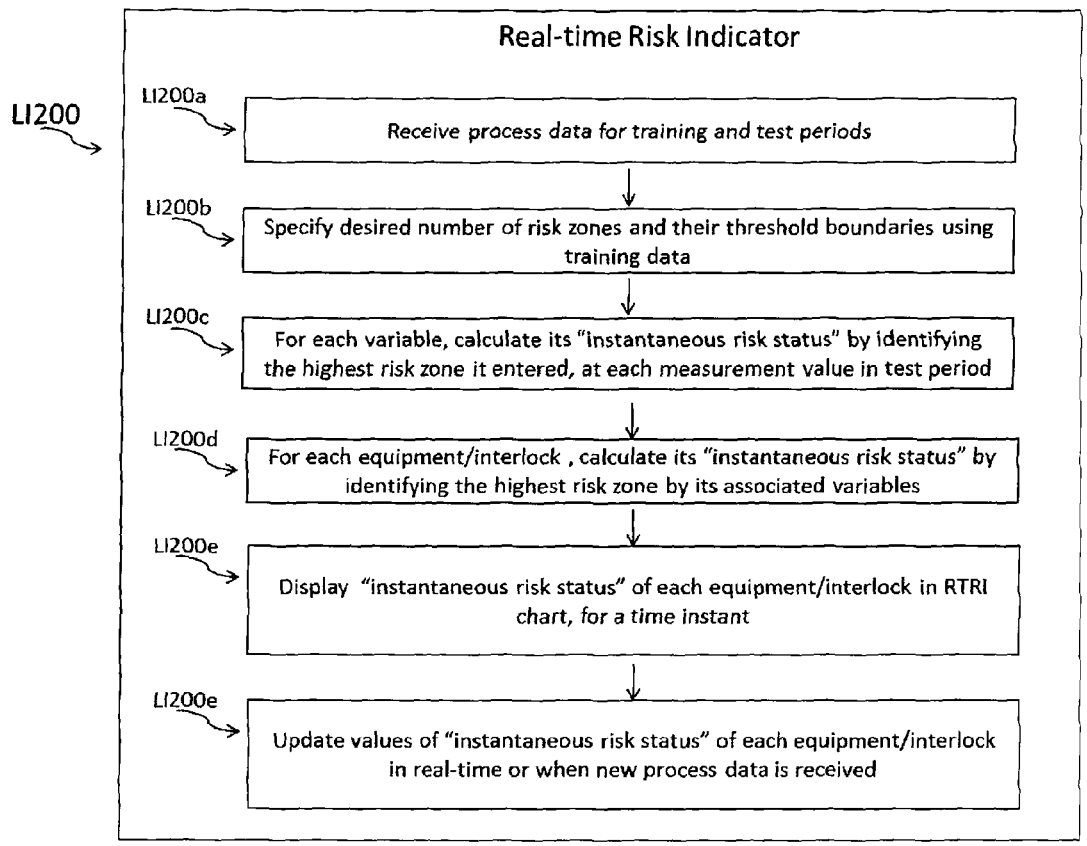
FIG. 35 schematically illustrates the concept of a "Real-Time Risk Indicator" in method LI200 to assess and display how risk associated with various equipment and interlocks/ESDs in a plant/facility changing with time FIG. 36 schematically illustrates the Near Miss Surfer system (NMS).

Real-Time Risk Indicator (RTRI):

The concept of "Real-time Risk Indicator" is defined to assess and display how risk associated with various equipments and interlocks/ESDs in a plant/facility changes with time. See, FIG. 35. For any variable, based on "discrete standard deviation levels," multiple "risk zones" are defined. For example, considering 3-sigma and 4-sigma levels as boundaries of a "risk zone," 3 different risk zones are defined. Similarly, considering 2-sigma, 2.5 sigma, 3-sigma, 3.5 sigma, 4-sigma, 4.5 sigma, 5-sigma, 5.5 sigma, and 6-sigma levels as boundaries of different risk zones, 10 different risk zones are defined.

Herein, a specific example is taken in which three risk zones are defined and referred as: "Z1," "Z2," and "Z3," with 3-sigma and 4-sigma as the separating boundaries respectively. First, for any variable, pre-flag limits are calculated using "training data." For any variable, the "instantaneous risk status" at each measurement value in test period is calculated as follows. At any instant, when variable is within "+3 sigma level" and "−3 sigma level," the "instantaneous risk status" is "Z1." When variable moves beyond its "3 sigma levels," but lies within its "+4-sigma level" or "−4 sigma level," the "instantaneous risk status" is "Z2." When variable moves beyond its "4-sigma levels," the "instantaneous risk status" is "Z3."

Based upon the above criteria, the following describes how RTRI is calculated, which includes all the equipments and interlocks of a plant/facility. At any instant, when any variable associated with an equipment/interlock moves beyond its "3 sigma levels" (but lies within its "4 sigma levels"), the "instantaneous risk status" of the equipment/interlock becomes "Z2." At any instant, when any variable associated with an equipment/interlock moves beyond its "4 sigma levels," the "instantaneous risk status" of the equipment/interlock becomes "Z3," While, at any instant, when all the variables associated with an equipment/interlock is within its 3-sigma levels, the "instantaneous risk status" of the equipment or interlock is "Z1."

IV. Near-Miss Surfer

Figure 36:
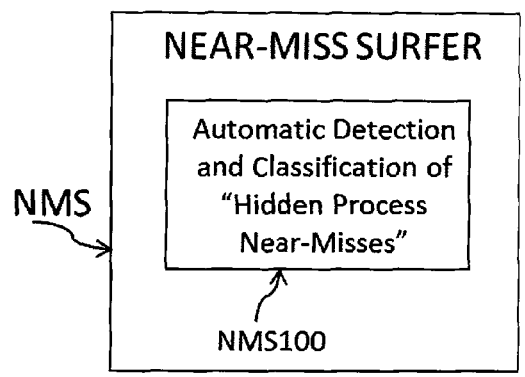

The Near-Miss Surfer system (NMS; illustrated in FIG. 36) automatically identifies process problems, referred as "hidden process near-misses" that can potentially lead to accidents having a major impact on safety, operability, quality, and/or business. A "near-miss" as defined by the Webster Free Dictionary and as used herein means: something narrowly avoided; a lucky escape. A "near miss" for safety purposes is an unplanned event that did not result in actual injury, illness, or damage—but had the potential to do so. Only a fortunate break in the chain of events prevented an injury, fatality or damage; in other words, a miss that was nonetheless very near. Although the label of 'human error' is commonly applied to an initiating event, a faulty process or in this case a failed alarm or alarm system invariably permits or compounds the harm, and therefore provides a focus for improvement. Such events may also be considered a "close call."

Most safety activities are reactive and not proactive, and as a result many organizations wait for losses to occur before taking preventative steps to prevent a recurrence. Near miss incidents often precede loss producing events, but they have been largely ignored because no injury, damage or loss actually occurred. Thus, many opportunities to prevent an accident or adverse incident are lost. However, recognizing and reporting near miss incidents, particularly measurable near misses, such as by alarms in an alarm-monitored plant/facility or by comparative data, such as the sigma data described herein, can make a major difference to the safety of workers within organizations, and often to the public at large, e.g., in the case of a nuclear-powered facility. History has shown repeatedly that most loss producing events (accidents) were preceded by warnings or near-missed accidents. Yet as disclosed above in alarm-monitored plants/facilities, these problems are identified using both alarm and process data.

A "process near-miss" is an event or a series of events associated with an operational process, which had the potential of becoming an "accident," but did not result in one. These events can be treated as precursors to accidents, hence, can be utilized by plant/facility operators as well as management to improve the system performance and prevent potential accidents. Normally process near-misses are observable events which can be reported, recorded and used for system improvement purposes.

In the prior art, events that caused the near-miss are often subjected to root-cause analysis to identify the defect in the system that resulted in the error and to determine factors that may either amplify or ameliorate the result. However, the present invention extends beyond the observed near misses, and relies upon the discovery that for every accident there are not only near-misses, but much like an iceberg, there are even more "hidden process near-misses" or more simply, "hidden near-misses." See FIG. 37. Thus, there is valuable risk information buried in the data that is generated and collected during a process. But the hidden near-misses are not observable in the process data, unless and until extracted and converted into an information format.

Figure 37:
FIG. 37 graphically shows a pyramid in which the peak is the actual accidents that occur at a plant/facility, but a larger number of observed or observable incidents are near-misses that did not result in an adverse incident, but could have. However, beneath the observable near misses are a large number of previously hidden or unobservable process near-misses that provide information that was not previously known or recognized as predictive of operational risks, and these form the bottom or underlying supporting level of the pyramid.

Thus, the present invention defines and identifies hidden process near-misses using pre-determined criteria or algorithms, summarized below and in FIGS. 37 and 38, which combine various riskiest changes or deviations in process conditions with respect to normal operations, that took place for a given unit in a given time period, and that could only be identified through rigorous calculations using process and or alarm data. As a result, "hidden process near misses" are defined as a deviation (or set of deviations) of a process condition as compared with its long-term or normal values. However, such near-misses are considered to be "hidden" because unlike the observed near misses, the hidden process near miss is not identifiable solely from current (whether normal or not) values of an associated variable or alarm. To the contrary, the current value of the variable or alarm has to be carefully compared against the long-term performance of the same elements to be able to identify the hidden near-misses.

As a result, most process near-misses are identified using one or more leading risk indicators as defined herein. But rather than providing methods for uncovering alarm or variable data, the present invention identifies and quantifies information within the data in the form of observed or observable near misses, and more particularly in the addition of information regarding hidden process near misses. Although recognizing their important differences, for simplicity of discussion, the sum of the observed or observable near misses, combined with and added to the hidden process near misses, are herein referred to together as "near misses," and the information extracted from the combined data is "near miss information."

Managing near-misses, that is identifying them and taking corrective action to prevent the recurrence of underlying problems, is an important practice in all industries in reduction of accidents and improvement of safety, operability, reliability, and quality. Current practice of near-miss management is limited to identification of near-misses by observation or by experiencing a particular problem. These are denominated generally herein and in FIG. 37, as "observed near misses." Near-Miss Surfer system identifies issues that can only be recognized by rigorous calculations explained by the methodologies mentioned herein. These methods help identify issues (generally referred to herein as "hidden process near misses") before they become visible or observed near-misses, which in some cases can be too late to manage, that is to prevent the undesirable outcome.

The concept of "near-misses" is of particular value when associated with personal safety, but it can also represent significant economic savings to the plant/facility. In the case of process or operational issues, the associated near-misses (referred as "process near-misses") are usually identified and reported by individuals, such as plant/facility operators, involved in the day-to-day operations. By comparison, similar reporting of near-misses associated with personal safety is referred to as a "personal near-miss," but for the purposes of this invention, both personal and process near-misses are referenced together as "process near-misses."

Advantageously the presented methodology of identifying, classifying, and reporting "process near-misses," associated with a given process, occurs automatically—without any human intervention, including the management of far more alarm instances at a given time or over a longer period than could be processed by an individual.

The NMS system comprises at least the following methods, which will be described in greater detail below: 1) Automatic detection and classification of Hidden Process Near-Misses; 2) Hidden Process Near-Misses based on Alarm Frequency Analysis; 3) Hidden Process Near-Misses based on Abnormal Events Analysis; 4) Hidden Process Near-Misses based on Time Segment Analysis; 5) Hidden Process Near-Misses based on Dynamic Risk Analysis; 6) Hidden Process Near-Misses based on Real-time Leading Signals Calculations; and 7) Hidden Process Near-Misses based on Quality Measurements.

Figure 38:
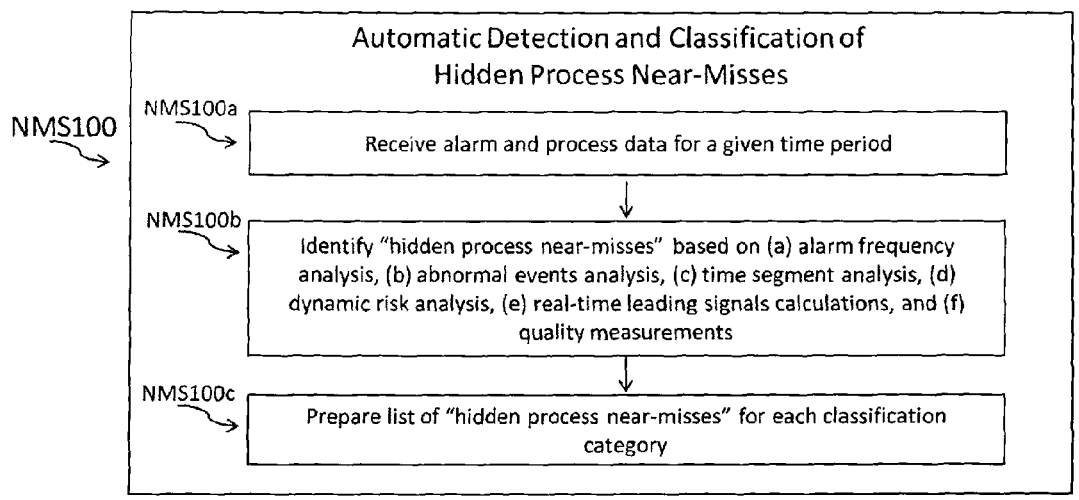
FIG. 38 schematically illustrates a method NMS100 in the Near Miss Surfer to detect and classify "hidden process near-misses" automatically.

Automatic Detection and Classification of Hidden Process Near-Misses:

A method NMS100 to detect and classify "hidden process near-misses" automatically is illustrated in FIG. 38. The following criteria are used to identify and classify "hidden process near-misses" over a given period of time (daily, weekly, monthly, etc.).

1. Hidden Process Near-Misses based on Alarm Frequency Analysis:

A "hidden process near-miss" is identified when one or more of the following conditions are met.
  a) If for a variable, or group of variables, the alarm frequency of any type (1 minute, 10 minute, hourly, daily, weekly, biweekly, monthly, etc.) for any period is more than a cutoff value. The cutoff value is set equal to the boundary between the associated "Moderate Frequency Zone" and "Extreme Frequency Zone" or the boundary between the associated "Normal Operations Zone" and "Moderate Frequency Zone" (as defined for "classified alarm frequency" charts), or at a fixed value defined by plant/facility personnel.
  b) When a "$\Delta_3$ alarm flood" or "$\Delta_2$ alarm flood" or "$\Delta_1$ alarm flood" occurs.
  c) When a "$\Delta_3$ alarm attack" or "$\Delta_2$ alarm attack" or "$\Delta_1$ alarm attack" occurs.

2. Hidden Process Near-Misses Based on Abnormal Events Analysis:

A "hidden process near-miss" is identified when one or more of these conditions are met.
  a) If any variable crosses its "shutdown limits" without resulting in any shutdown. These abnormal events are defined as "ultimate abnormal events." "Shutdown limit" refers to the threshold value, which when exceeded either triggers automatic shutdown of an equipment/area of plant/facility, or of entire plant/facility, or activates safety instrumented systems. As indicated, the shutdown limits are specified by plant/facility personnel during the commissioning of the plant.
  b) When a "1st stage abnormal event," or "2nd stage abnormal event," or "3rd stage abnormal event," or "nth stage abnormal event" occurs for a variable, where 'n' is the total number of alarm levels for the variable.
  c) If for a variable or group of variables, the abnormal event frequency for any period is more than a cutoff value. The cutoff value is set equal to the boundary between the associated "Moderate Frequency Zone" and "Extreme Frequency Zone" or to the boundary between the associated "Normal Operations Zone" and "Moderate Frequency Zone" (defined as above using classified charts for abnormal events frequency), or at a fixed value defined by plant/facility personnel.
  d) If for a variable, "risk score," or "effective risk score" associated with any abnormal event is more than a cutoff value. The cutoff value is set at a high percentile value, calculated using a training set of data, for example, 90th percentile calculated using risk scores or effective risk scores based on the "training data" (for example, set for the last 30 days of data), or at a fixed value defined by plant/facility personnel.

3. Hidden Process Near-Misses Based on Time Segment Calculations:

A "hidden process near-miss" is identified when one or more of the following conditions are met.
  a) If for a variable, its "recovery time" or "effective recovery time" associated with any alarm level is more than a cutoff value. The cutoff value is set at a high percentile value, calculated using a training set of data, for example, 90th percentile calculated using recovery times or effective recovery times based on a "training data" (for example, 30 days of data), or at a fixed value defined by plant/facility personnel, for example, 2 hours.
  b) If for a variable, its "inter-arrival time" or "effective inter-arrival time" associated with any alarm level is less than a cutoff value. The cutoff value is set at a low percentile value, calculated using a training set of data, for example, 10th percentile calculated using inter-arrival times or effective inter-arrival times based on a "training data" (for example, last 30 days of data), or at a fixed value defined by plant/facility personnel, for example, 10 seconds.
  c) If for a variable, its "kick-off time" or "effective kick-off time" associated with any alarm level is less than a cutoff value. The cutoff value is set at a low percentile value, calculated using a training set of data, for example, 10th percentile calculated using kick-off times or effective kick-off times, based on a "training data" (for example, last 30 days of data), or at a fixed value defined by plant/facility personnel, for example, 10 seconds.
  d) If for a variable, its "acceleration time" or "effective acceleration time" (associated with any two alarm levels, wherein the alarm levels do not have to be consecutive alarms levels) is less than a cutoff value. The cutoff value is set at a low percentile value, calculated using a training set of data, for example, 10th percentile calculated using acceleration times or effective acceleration times based on a "training data" (for example, last 30 days of data), or at a fixed value defined by plant/facility personnel, for example, 10 seconds.
  e) If for any variable, its "deceleration time" or "effective deceleration time" associated with any two alarm levels (note: the alarm levels do not have to be consecutive alarms levels) is more than a cutoff value. The cutoff value is set at a high percentile value, calculated using a training set of data, for example, 90th percentile calculated using deceleration times or effective deceleration times based on a "training data" (for example, last 30 days of data), or at a fixed value defined by plant/facility personnel, for example, 2 hours.

f) If for a variable, its "neighborhood time" or "effective neighborhood time" associated with any alarm level is more than a cutoff value. The cutoff value is set at a high percentile value, calculated using a training set of data, for example, 90th percentile calculated using neighborhood times or effective neighborhood times based on a "training data" (for example, last 30 days of data), or at a fixed value defined by plant/facility personnel, for example, 2 hours.

4. Hidden Process Near-Misses Based on Dynamic Risk Analysis:

A "hidden process near-miss" is identified when one or more of the following conditions are met.

a) When a "$\Delta_3$ transition" or "$\Delta_2$ transition" or "$\Delta_1$ transition" (for any tier of transitions) occurs.

b) When "dynamic risk index" of a variable or group of variables or overall plant turns "RL2" or "RL3" or "RLn," where 'n' refers to the total number of risk levels.

c) If, for a variable or group of variables, the associated "Compounded Risk Score" is in "Z3" or "Z2" zone (any grade).

5. Hidden Process Near-Misses Based on Real-Time Leading Signals Calculations:

A "hidden process near-miss" is identified when one or more of the following conditions are met.

a) When a variable goes beyond certain "discrete standard deviation levels," such as 3-sigma, 3.5-sigma, 4-sigma, 4.5-sigma, 5-sigma, 5.5-sigma, 6-sigma, etc., calculated using "training data."

b) When "instantaneous risk status" of an equipment or interlock in "Real-time Risk Indicator," turns "Z2" and/or "Z3."

6. Hidden Process Near-Misses Based on Quality Measurements:

A "hidden process near-miss" is identified when one or more of the following conditions are met.

a) When an important product quality variable (e.g., viscosity, density, molecular weight, etc.), that is measured online, goes below (or above) a cutoff value that is totally unacceptable for the operation. This value is specified by the plant/facility personnel, e.g., if value goes below "−3-sigma level" (or above "+3 sigma level") value, calculated using a "training data" (for example, last 90 days of data).

b) If the total recovery time for a product quality variable in a given time period exceeds a cutoff value. The cutoff value is specified by the plant/facility personnel, e.g., 2 hours in a day, or similar predetermined periods or ranges of time or other conditions.

Accordingly most process near-misses are identified using one or more leading risk indicators, defined herein.

Accordingly, identification and analysis/calculation of observed near-misses together with hidden process near-misses in a plant/facility provide an opportunity to take corrective action to reduce or prevent the recurrence of underlying risks and/or problems as compared to the observed and/or hidden risk levels without such monitoring. Alarm occurrences, or changes in alarm patterns, at an alarm-monitored plant/facility offer an exemplary tool, but not the only tool, for measuring observed near miss and hidden process near-miss occurrences. The product of monitored near-miss/hidden near-miss occurrences results in a measurable reduction in the number of operational or personal accidents at the plant/facility, and improved safety and operability, including both reliability and quality of operation. Although an observed near-miss can be defined in many different ways depending in the criteria used to identify and measure its occurrence, a near-miss analysis provides an opportunity to improve environmental, health and safety practices (together referred to herein simply as "practices") at a plant/facility based upon one or more observed conditions or changes in condition(s), or to reduce or prevent incident(s) with potential for a more serious consequences at the plant/facility. Added to the near-miss analysis is an analysis of hidden process near-misses, which while unobserved unless determined by the calculations and analyses of process and/or alarm data of the present invention to identify deviations from normal/long-term behavior that have the potential of serious consequences for process safety, reliability, quality and operability, such as an accident and/or an unplanned shutdown of the plant/facility.

When the hidden process near-misses are combined with observed near-misses in an analysis of process and/or alarm data at a plant/facility, the data provide opportunities to operating teams to improve safety, reliability, quality, and operability by at the plant/facility, by equipping the owners or operators with automatic and advanced information on potential problem areas, which in most cases are not otherwise identified or identifiable by regular process analyses.

Profilebook:

A "profilebook" is utilized when the results of calculations performed by different modules of DRPS are stored as "profile pages" for each individual variable, alarm flood, alarm attack, transition, equipment, interlock, and the overall unit. These profile pages serve as a reporting system and a repository of information obtained from the associated set of calculations, providing easy access to detailed and/or historical information for each component of the System in an organized manner. Therefore, it eliminates the need to provide unnecessary details to the plant/facility operators and management on an ongoing basis, yet still provides them with such information as needed.

Individual profile pages are provided for a variable, including, but not limited to results for alarms associated with the variable(s) relating to one or more of: an "advanced alarm frequency analysis;" an "abnormal event analysis," including for an "abnormal events matrix," "risk scores" for associated abnormal events, and "abnormal events frequency analysis;" a "time segment analysis" and "notables;" "rank variation charts;" "prominent transitions" charts, if any, "dynamic risk index," including results of "acceleration time" analysis and/or "probability analysis;" "compounded risk score;" "leading signals," if any; and "real-time risk indicator." Profile pages regarding alarms relating to equipment, to Interlock/ESD, and to the overall unit/plant or facility, are similarly provided. Regarding an alarm flood and/or alarm attack, profile pages are provided to show one or more of: individual characteristics of alarm floods and/or alarm attacks (e.g., criticality levels, duration, weighted alarms, intensity, share of significant alarms, etc., as defined in Alarm Fitness module; "time segment analysis" and "advanced alarm frequency analysis" for alarms that occurred during the alarm flood and/or alarm attack.

The disclosure of each patent, patent application and publication cited or described in this document is hereby incorporated herein by reference, in its entirety.

While the foregoing specification has been described with regard to certain preferred embodiments, and many details have been set forth for the purpose of illustration, it will be apparent to those skilled in the art without departing from the spirit and scope of the invention, that the invention may be subject to various modifications and additional embodiments, and that certain of the details described herein can be varied considerably without departing from the basic principles of the invention. Such modifications and additional embodiments are also intended to fall within the scope of the appended claims.

We claim:

1. A method for identifying a hidden process near-miss in a plant/facility operation, the method comprising:
    collecting measured data associated with at least one process variable, although without related adverse incident;
    collecting long-term process data for a period preceding the collecting measured data wherein the long term process data is automatically updated over time;
    determining normal values or value ranges, or combinations thereof, based on long-term process data, and comparing the measured data associated with the at least one process variable with the collected long-term process data to determine deviation there between measured data relative to determined normal value(s), wherein a measure or extent, or both, of the deviation identifies at least one hidden process near-miss.

2. The method of claim 1, further comprising measuring process variables automatically at a predetermined frequency, and then dating and reporting the measurements for comparison in real-time, on-demand, periodically, or in combinations thereof.

3. The method of claim 1, further comprising automatically issuing a leading signal alert indicating when deviation is greater than a predetermined normal value, together with information regarding the identified at least one process variable associated with the hidden process near-miss.

4. The method of claim 1, further comprising correlating extent of the hidden process near-miss deviation from normal operation of the at least one process variable in terms of risk of occurrence of an adverse incident.

5. The method of claim 1, further comprising characterizing the identified hidden process near miss or an observed near miss by determining scale, criticality, and frequency of occurrence or occurrence of an abnormal event.

6. The method of claim 5, further comprising determining one or more criterion for the at least one variable based upon its characterization in terms of frequency of occurrence of at least one abnormal event.

7. The method of claim 6, further comprising determining at least one dynamic risk index for each of the at least one variables by combining or averaging the risk levels defined by the one or more criterion.

8. The method of claim 7, further comprising for each of the one or more variables determining a compounded risk score by identifying a maximum risk zone that was entered and an associated grade assigned to the variable because of its entry.

9. The method of claim 4, wherein risk of occurrence of an adverse event is a function of the extent of deviation relative to the identified hidden process near-miss.

10. A method for determining operational fitness at a plant/facility, the method comprising:
    identifying near-misses based upon information extracted from data provided by one or more measurable criteria for automatic detection and classification of observed near-misses and hidden process near-misses, the criteria identified in the group consisting of: abnormal events analysis, time segment analysis, dynamic risk analysis; and real-time leading signals calculation(s);
    compiling and processing the identified information from the measurable criteria for dynamically and automatically determining change or escalation, on-demand, in real-time, periodically or in combinations thereof of the identified information as compared with that of corresponding data from a previous time period or measurement, or within a designated test period; and reporting same.

11. The method of claim 10, wherein the report provides information enabling plant/facility operating personnel to take preemptive corrective action, comprising revising operating procedures at the plant/facility or process design, or both, to avoid occurrence of an adverse incident.

12. A method of claim 10, comprising further identifying near-misses based upon information extracted from data provided by the abnormal events analysis, wherein one or more observed near-misses or hidden process near-misses, or a combination thereof, is identified when one or more variables crosses a predetermined operational shutdown limit without a resulting shutdown, or when the frequency of one or more variables or the risk score or effective risk score associated with an abnormal event exceeds more than a predetermined fixed value or cutoff value in a predetermined time period, or combinations thereof, wherein the predetermined time period is a moving time period updated automatically.

13. A method of claim 10, further comprising, generating one or more real-time leading signals by monitoring trajectory of a variable and determining previously unforeseen percentage deviation(s) from running averages of the process values of that variable at predetermined time intervals; and when percentage deviation from long-term data is greater than a predetermined cut-off value, assigning a violation tag, and generating a leading signal therefrom to forewarn plant/facility operators of one or more potential adverse incidents or shutdowns.

14. A method of claim 13, further comprising identifying near-misses based upon information extracted from data provided by the one or more real-time leading signals, wherein a variable exceeds predetermined discrete standard deviation levels, as compared with long-term operation data, training data or test data in terms of normal, or when risk status of an equipment or interlock changes or escalates above predetermined normal(s) or long-term level(s) as measured by a real-time risk indicator.

15. A method for identifying a hidden process near-miss in an alarm-monitored plant/facility operation, the method comprising:
    collecting measured alarm data associated with at least one alarm-monitored process variable, although without related adverse incident;
    collecting long-term alarm data for a period preceding the collecting measured alarm data; and
    determining normal values or value ranges, or combinations thereof, based on long-term alarm data comparing the measured alarm data associated with the at least one alarm-monitored process variable with the collected long-term alarm data to determine deviation between the collected alarm data relative to determined normal value(s), wherein a measure and extent of the deviation identifies and characterizes at least one alarm data-related hidden process near-miss.

16. The method of claim 15, further comprising measuring alarm-data for an alarm-monitored process variable automatically as alarm-data becomes available, and then dating and reporting the measured alarm-data for comparison in real-time, on-demand, periodically, or in combinations thereof.

17. The method of claim 15, further comprising correlating extent of the alarm-data related hidden process near-miss deviation from normal alarm-monitored operation of the at least one process variable in terms of risk of occurrence of an adverse incident.

18. The method of claim 15, further comprising characterizing the identified alarm-monitored hidden process near miss or an observed near miss by determining scale, criticality, and frequency of alarm occurrence or of occurrence of an abnormal event.

19. The method of claim 18, further comprising determining one or more criterion for the at least one alarm-monitored variable, based upon its characterization in terms of frequency of occurrence of one or more abnormal events.

20. The method of claim 19, further comprising determining at least one dynamic risk index for each of the at least one alarm-monitored variables by combining or averaging the risk levels defined by the one or more criterion.

21. The method of claim 20, further comprising for each of the one or more alarm-monitored variables determining a compounded risk score by identifying, time spent beyond the normal alarm level for the variable, a maximum risk zone that was entered and an associated grade assigned to the variable because of its alarm value.

22. The method of claim 17, wherein quantitatively a risk of occurrence of an adverse event is a function of the extent of deviation relative to an identified hidden process near-miss.

23. A method of claim 10, comprising further determining alarm fitness when operations and process variables are monitored at the plant/facility by a plurality of alarms in an alarm system, wherein one or more selected alarm-monitored process variables are each monitored by one or more alarms or an alarm system, the method comprising: identifying near-misses based upon information extracted from data provided by one or more measurable criteria for automatic detection and classification of observed near-misses and hidden process near-misses, the criteria identified in, but not limited to, the group consisting of alarm frequency analysis, risk-based alarm data analysis, abnormal events analysis, time segment analysis, and dynamic risk analysis; compiling and processing the identified information from the selected criteria for dynamically and automatically determining change or escalation, on-demand, in real-time, periodically or in combinations thereof of the identified information as compared with that of corresponding data from a previous moving time period or measurement, or within a designated test period; and reporting same.

24. The method of claim 23, wherein the report provides information enabling plant/facility operating personnel to take preemptive corrective action, comprising revising operating procedures at the plant/facility or process design, or both, to avoid occurrence of an adverse incident.

25. A method of claim 23, wherein identifying information in near-miss data in the alarm based-monitoring system, provided by determining frequency and the alarm analysis criteria, further comprises determining measurable difference(s) from a predetermined fixed value or cutoff value, or when an alarm flood or an alarm attack occurs.

26. A method of claim 23, further comprising conducting one or more time segment analyses based on the time(s) when an alarm is activated or when the alarm is inactivated or deactivated, or a combination thereof, for the same variable, providing an orderly arrangement of the alarm data based upon deviation of the one or more variables from normal or long-term data, thereby identifying the highest risk alarm and associated variable.

27. A method of claim 23, further comprising classifying alarm fitness by conducting an advanced frequency analysis using a comparative view of significance levels to describe the identified near-miss data, identifying or classifying frequency of the comparative data to permit interpretation, and analyzing the data within a given region and between regions for one or more time periods.

28. A method of claim 27, further comprising identifying notable alarms using criteria identified in but not limited to the group consisting of alarm frequency analysis and time segment analysis.

* * * * *